(12) United States Patent
Craven et al.

(10) Patent No.: US 9,870,777 B2
(45) Date of Patent: Jan. 16, 2018

(54) LOSSLESS EMBEDDED ADDITIONAL DATA

(71) Applicants: Peter Graham Craven, Greater London (GB); Malcolm Law, West Sussex (GB)

(72) Inventors: Peter Graham Craven, Greater London (GB); Malcolm Law, West Sussex (GB)

(*) Notice: Subject to any disclaimer, the term of this patent is extended or adjusted under 35 U.S.C. 154(b) by 246 days.

(21) Appl. No.: 14/353,660

(22) PCT Filed: Oct. 24, 2012

(86) PCT No.: PCT/GB2012/052648
§ 371 (c)(1),
(2) Date: Jul. 21, 2014

(87) PCT Pub. No.: WO2013/061062
PCT Pub. Date: May 2, 2013

(65) Prior Publication Data
US 2015/0279378 A1 Oct. 1, 2015

(30) Foreign Application Priority Data

Oct. 24, 2011 (GB) .................................. 1118331.6

(51) Int. Cl.
*G10L 19/00* (2013.01)
*G10L 19/018* (2013.01)
(Continued)

(52) U.S. Cl.
CPC ........ *G10L 19/0017* (2013.01); *G10L 19/018* (2013.01); *G11B 20/00289* (2013.01);
(Continued)

(58) Field of Classification Search
None
See application file for complete search history.

(56) References Cited

U.S. PATENT DOCUMENTS 5,687,191 A    11/1997  Lee et al.
5,973,629 A    10/1999  Fujii
(Continued)

FOREIGN PATENT DOCUMENTS

GB         2495918 A       5/2013
WO    2004/066272 A1       8/2004
(Continued)

OTHER PUBLICATIONS

Gerzon, Michael A., et al., "A High-Rate Buried-Data Channel for Audio CD".
(Continued)

*Primary Examiner* — Marivelisse Santiago Cordero
*Assistant Examiner* — Lennin Rodriguezgonzalez
(74) *Attorney, Agent, or Firm* — Buckley, Maschoff & Talwalkar, LLC

(57) ABSTRACT

Methods are disclosed for an encoder to embed a data stream into a quantized PCM digital audio signal and for a corresponding decoder to both retrieve the data stream and losslessly reconstruct the exact original audio. Some methods employ complimentary amplification and attenuation, while others employ gain redistribution. Pre-emphasis and soft clipping techniques are described as methods of losslessly reducing the peak excursion of the PCM audio signal. Also described is the lossless placing of data at predetermined positions within an audio stream.

25 Claims, 14 Drawing Sheets

(51) Int. Cl.
*G11B 20/00* (2006.01)
*G11B 20/10* (2006.01)

(52) U.S. Cl.
CPC .. *G11B 20/00891* (2013.01); *G11B 20/10527* (2013.01); *G11B 2020/10546* (2013.01)

(56) References Cited

U.S. PATENT DOCUMENTS

| | | | |
|---|---|---|---|
| 6,108,622 A | | 8/2000 | Xue et al. |
| 6,128,591 A | * | 10/2000 | Taori ................. G10L 19/18 704/211 |
| 2001/0038643 A1 | | 11/2001 | McParland |
| 2003/0149879 A1 | * | 8/2003 | Tian ................. G06T 1/0028 713/176 |
| 2005/0191040 A1 | * | 9/2005 | Takagi ............... G11B 20/1202 386/263 |
| 2006/0140440 A1 | | 6/2006 | Van Der Veen et al. |
| 2006/0225106 A1 | * | 10/2006 | Bedingfield, Sr. . H04N 7/17318 725/95 |
| 2010/0017196 A1 | | 1/2010 | Ryu et al. |
| 2011/0179338 A1 | | 7/2011 | Craven et al. |

FOREIGN PATENT DOCUMENTS

| | | |
|---|---|---|
| WO | 2004/090868 A1 | 10/2004 |
| WO | 01/67671 A2 | 9/2011 |

OTHER PUBLICATIONS

Patents Act 1977: Search Report under Sections 17(5), dated Jan. 9, 2013, for GB Application No. GB1118331.6, 4pgs.
"PCT Notification of the International Search Report and the Written Opinion of the International Searching Authority", dated May 7, 2013 (May 7, 2013), for International Application No. PCT/GB2012/052648, 10pgs.

* cited by examiner

LOSSLESS EMBEDDED ADDITIONAL DATA

CROSS-REFERENCED TO RELATED APPLICATION

This application is a U.S. National Stage filing under 35 U.S.C. §371 and 35 U.S.C §119, based on and claiming priority to PCT/GB2012/052648 for "LOSSLESS EMBEDDED ADDITIONAL DATA" filed Oct. 24, 2012, claiming priority to GB Patent Application No. 1118331.6 filed Oct. 24, 2011.

FIELD OF THE INVENTION

The present invention relates to methods and devices for losslessly burying data into a digital audio signal, particularly a pulse code modulated (PCM) signal.

BACKGROUND TO THE INVENTION

It is often required to convey additional data, such as "metadata", along with a stream of digital audio. The most convenient and reliable way to do this is to "bury" the additional data into the audio stream itself, since separately-carried data often gets lost.

An elementary way to bury data is to replace the least-significant-bit of an audio data word in a Pulse Code Modulation (PCM) stream by a bit of the additional data stream. This is not recommendable as an audiophile procedure, however, as it results in undithered truncation of the audio data word and the insertion of noise which may contain tones if the additional data stream contains repeating patterns.

More sophisticated approaches are discussed in the paper "A High-Rate Buried-Data Channel for Audio CD" by Gerzon, Michael A. and Craven, Peter G., J. Audio Eng. Soc. Volume 43 Number 1/2 pp. 3-22; January/February 1995. However, prior art methods of burying data have resulted in a loss of audio quality which, although small, may be unacceptable in circumstances where "lossless" or bit-exact transmission of a digital audio signal is demanded.

It is intrinsic that a stream that conveys additional data is different from an original stream from which it was derived. However, it might be possible to recover the original stream if the data could be buried in a way such that a special decoder is able to recover the original digits exactly. Accordingly, there is a need for improved encoding and decoding techniques, which can better retain the original audio quality.

SUMMARY OF THE INVENTION

According to a first aspect of the invention there is provided a method of losslessly burying binary data into a pulse code modulated 'PCM' digital audio signal, the method comprising the steps of:
  receiving a PCM digital audio signal having samples whose values are quantised and define a range of values;
  receiving binary data;
  establishing a gain function for a decoder, said gain function having a gradient g that is less than unity over at least part of the range and that is not a constant integer power of two over the whole range;
  taking the quantised value of a sample and choosing a replacement sample value from a set of quantised values that, when mapped by the gain function and quantised, would yield a value equal to said quantised value of the sample; and,
  replacing the sample by the replacement sample value, wherein, conditionally on the set of quantised values containing more than one value, the step of choosing is performed in dependence on the binary data.

In some embodiments the method further comprises the step of determining the set of quantised values that, when mapped by the gain function and quantised, would yield a value equal to said quantised value of the sample.

Preferably, the method further comprises the step of losslessly pre-emphasising the digital audio signal in order to reduce the amplitude of frequency components that have high energy. In some embodiments an invertible filter is combined with the gain block to allow the gain to vary across the audio spectrum. Typically, the gain is reduced at frequencies containing high signal energy and correspondingly increased a frequencies containing low signal energy. The total signal energy is thereby reduced, which allows the invention to maintain the data channel even when the audio is close to maximum representable level in some parts of the spectrum (typically at lower frequencies).

According to a second aspect of the invention there is provided a method of decoding a digital audio signal, the method comprising the steps of:
  receiving quantised signal samples whose values y' are quantised and define a range of values;
  processing a received quantised signal sample value using a predetermined algorithm, wherein the predetermined algorithm comprises the steps of:
    applying a decoder gain function having a gradient g that is less than unity over at least part of the range and that is not a constant integer power of two over the whole range; and,
    requantising to furnish an output signal sample, and
  conditionally on whether the predetermined algorithm maps a plurality of possible quantised signal sample values to the output signal sample value, furnishing output data in dependence on which quantised signal sample value from the plurality was actually received.

Preferably, the step of processing furnishes an output quantised signal sample as:

quant($(y'+r) \times g$)

where r is a dither value and quant is a quantising operation selected from: rounding up; rounding down; and, rounding to nearest. The method may further comprise the step of retrieving information from the quantised signal samples and generating the dither value r in dependence on said information.

An encoder and a decoder are adapted to perform the method of the first and second aspects, respectively, and a codec combines the encoder and decoder. A data carrier may comprise an audio signal encoded using the method.

Thus, the encoding method of the first aspect takes an original high quality digital audio signal applies a gain $1/g \geq 1$ to produce lower quality audio, we call preview audio, or alternatively a "composite signal", and the decoding method takes the preview audio and applies a corresponding gain $g \leq 1$ to regenerate an exact replica of the original digital audio signal.

When g<1, there is redundancy in the preview audio in that multiple sequences of preview audio will generate the same output audio sequence from the decoder. According to the invention, this redundancy is utilised to convey a data channel in the preview audio from the encoder to the decoder.

According to a third aspect of the invention there is provided a method of losslessly burying binary data into a set of signal samples representing a portion of a digital audio signal, the method comprising the steps of:
  dividing the set of signal samples into a first nonempty subset of signal samples and a second nonempty subset of signal samples;
  losslessly burying the binary data into at least some signal samples in the first nonempty subset; and,
  decreasing the gain of signal samples in the first nonempty subset and increasing the gain of signal samples in the second nonempty subset by applying a lossless matrix transformation to the samples in the set.

Preferably, the step of losslessly burying the binary data comprises:
  shifting a signal sample left by n places where n is a positive integer, the signal sample thereby acquiring a gain of $2^n$; and,
  inserting a bit of binary data into one of the n least significant bit positions of the sample.

The method may further comprise the step of losslessly pre-emphasising the digital audio signal in the manner described previously in order to reduce the amplitude of frequency components that have high energy, In some embodiments the method of the third aspect further comprises the steps of:
  receiving a PCM audio signal having samples whose values are quantised and lie within a predetermined range;
  establishing a nonlinear many-to-one function that maps a range of values exercised by the signal samples to a smaller range values;
  applying the many-to-one function to a sample of the signal to furnish a quantised compressed value;
  furnishing information that identifies which member of a set of sample values corresponds to the sample, wherein said set of sample values when mapped by the many-to-one function would result in values equal to the quantised compressed value;
  replacing the first sample by the quantised compressed value; and,
  conditionally on the set containing more than one value, losslessly burying binary data representing the information into the PCM audio signal.

Alternatively or additionally, the method may further comprise the steps of:
  retrieving signal bits from a predetermined set of bit positions;
  losslessly burying the retrieved signal bits into the PCM digital audio signal; and,
  placing the binary data into bit positions within the predetermined set of bit positions.

According to a fourth aspect of the invention there is provided a method of retrieving binary data from a set of signal samples representing a portion of a digital audio signal, the method comprising the steps of:
  dividing the set of signal samples into a first nonempty subset of signal samples and a second nonempty subset of signal samples; and,
  retrieving the binary data from signal samples in the first nonempty subset; and,
  applying a lossless matrix transformation to the samples in the set, wherein the step of retrieving is performed using a lossless buried data method,
  and wherein the lossless matrix transformation increases the gain of signal samples in the first nonempty subset and decreases the gain of signal samples in the second nonempty subset.

In some embodiments the step of retrieving the binary data comprises:
  extracting a bit of binary data from one of the n least significant bit positions of a sample; and,
  shifting the signal sample right by n places where n is a positive integer, the signal sample thereby acquiring a gain of $2^{-n}$.

Preferably, n=1.

In some embodiments the method of the fourth aspect may further comprise the step of losslessly de-emphasising the digital audio signal in order to restore the amplitude of amplitude of frequency components that have been reduced by lossless pre-emphasis.

Additionally or alternatively, the method may further comprise the steps of:
  retrieving binary data from the PCM audio signal using a method of lossless buried data;
  establishing a function that maps a range of values spanned by the signal samples to a larger range of quantised values;
  applying the function to a received sample yielding a set of quantised values; conditionally on the set containing only one quantised value, replacing the signal sample by a sample having a value equal to said quantised value; and,
  conditionally on the set containing more than one quantised value, choosing a quantised value from the set in dependence on the retrieved binary data and replacing the signal sample by a sample having a value equal to the chosen quantised value.

Preferably, the step of retrieving binary data comprises:
  establishing a set of bit positions within the stream that contain binary data;
  retrieving binary data bits from the set of bit positions;
  retrieving signal bits from the PCM digital audio signal using a method of lossless buried data; and,
  placing the signal bits into the set of bit positions.

An encoder and a decoder are adapted to perform the method of the third and fourth aspects, respectively, and a codec combines the encoder and decoder. A data carrier may comprise an audio signal encoded using the method.

In these third and fourth aspects of the invention, the gain is applied to blocks containing multiple samples of audio rather than single samples. Initially the gain may be applied in a non-uniform matter and redistributed afterwards by a matrix transformation. A particularly convenient and efficient embodiment applies a gain of a factor two to a subset of the samples in the block prior to redistribution.

In all four aspects described so far, additional information is buried into the signal or retrieved from the signal and the gain of the signal is altered as a result. The change of gain is crucial to ensure that information theory is not violated, and the term "gain block" will be used to refer to functional units within an encoder or a decoder that bury or retrieve data in this way. For the avoidance of doubt, this use of the word "block" is distinct from its use to refer to a "block" of contiguous signal samples.

In some embodiments of the invention, a pseudo-random number, synchronised between encoder and decoder, is used in applying the gains to improve the audio quality of the preview signal.

According to a fifth aspect of the invention there is provided a method of losslessly placing binary data into a predetermined set of bit positions within a stream of audio data bits representing a PCM digital audio signal, the method comprising the steps of:

retrieving signal bits from the predetermined set of bit positions;

losslessly burying the retrieved signal bits into the PCM digital audio signal; and, placing the binary data into bit positions within the predetermined set of bit positions.

In some embodiments the method of the fifth aspect is adapted to perform lossless degradation of the PCM digital audio signal, wherein the method further comprises the steps of:

receiving an instruction stream governing a degradation to be performed; and, losslessly degrading the audio signal in dependence on the instruction stream, wherein the binary data comprises data derived in dependence on the instruction stream.

Preferably, the binary data comprises synchronisation patterns recognisable by a decoder.

The method of the fifth aspect may further comprise the step of receiving an encryption key, wherein the step of losslessly degrading is performed in dependence on the encryption key.

In preferred embodiments, the predetermined bit positions are the 16th bit of each of a predetermined set of samples of the PCM digital audio signal.

In some embodiments the step of losslessly burying does not change the contents of the bit positions in the predetermined set of bit positions.

As with previous aspects, the method may further comprise the step of losslessly pre-emphasising the digital audio signal in order to reduce the amplitude of frequency components that have high energy.

According to a sixth aspect of the invention there is provided a method of losslessly retrieving binary data from a stream of audio data bits representing a PCM digital audio signal, the method comprising the steps of:

establishing a set of bit positions within the stream that contain binary data;

retrieving binary data bits from the set of bit positions;

retrieving signal bits from the PCM digital audio signal using a method of lossless buried data; and, placing the signal bits into the set of bit positions.

Preferably, the step of establishing comprises searching for a synchronisation pattern.

In some embodiments the method of the sixth aspect is adapted to restore an audio stream to which a degradation has been applied, wherein the method further comprising the step of reversing the degradation in dependence on the binary data bits. It is preferred that the method also comprises the step of receiving an encryption key, wherein the step of reversing is performed in dependence on the encryption key.

In preferred embodiments the set of bit positions consists of the 16th bit position of each of a set of samples of the PCM digital audio signal.

An encoder and a decoder are adapted to perform the method of the fifth and sixth aspects, respectively, and a codec combines the encoder and decoder. A data carrier may comprise an audio signal encoded using the method.

In these aspects of the invention, the encoder splits off the least significant bit (lsb) of the original audio. Some of the lsbs are removed and replaced by a user data channel. The remaining audio is processed through operations including a gain block and the data channel provided by the gain block is used to carry the removed lsbs. The processed audio is then recombined with the altered lsbs to create preview audio of the same wordwidth as the original audio. The decoder reverses the operations to recover the original audio.

The advantage of having the two levels of data channel is that the user data channel can be recovered by the decoder without having to perform the gain operations. This is particularly useful when the parameters (for example gain g) controlling the operation of the gain block are carried in the data channel.

According to a seventh aspect of the invention there is provided a method of losslessly reducing the peak excursion of a PCM audio signal, the method comprising the steps of:

receiving a PCM audio signal having samples whose values are quantised and lie within a predetermined range;

establishing a nonlinear many-to-one function that maps the predetermined range of quantised samples to a smaller range of quantised samples;

applying the many-to-one function to a first sample of the signal to furnish a quantised compressed value;

furnishing information that identifies which member of a set of sample values corresponds to the first sample, wherein said set of sample values when mapped by the many to one function would result in values equal to the quantised compressed value;

replacing the first sample by the quantised compressed value; and, conditionally on the set containing more than one value, losslessly burying the information into the PCM audio signal.

The method may further comprise the step of determining the set of sample values which, when mapped by the many-to-one function, would result in values equal to the quantised compressed value.

In some embodiments the method further comprising the steps of:

retrieving signal bits from a predetermined set of bit positions;

losslessly burying the retrieved signal bits into the PCM digital audio signal; and, placing the binary data into bit positions within the predetermined set of bit positions.

According to an eighth aspect of the invention there is provided a method of losslessly restoring the peak excursion of a PCM audio signal, the method comprising the steps of:

receiving a PCM audio signal having samples whose values are quantised and lie within a predetermined range;

retrieving information from the PCM audio signal using a method of lossless buried data;

establishing a function that maps the predetermined range of quantised values to a partition of a larger range of quantised values;

applying the function to a received sample yielding a set of quantised values;

conditionally on the set containing only one quantised value, replacing the received sample by a sample having a value equal to said quantised value; and, conditionally on the set containing more than one quantised value, choosing a quantised value from the set in dependence on the retrieved information and replacing the received sample by a sample having a value equal to the chosen quantised value.

Preferably, the step of retrieving information comprises:

establishing a set of bit positions within the stream that contain binary data; retrieving binary data bits from the set of bit positions;

retrieving signal bits from the PCM digital audio signal using a method of lossless buried data; and, placing the signal bits into the set of bit positions.

An encoder and a decoder are adapted to perform the method of the fifth and sixth aspects, respectively, and a codec combines the encoder and decoder. A data carrier may comprise an audio signal encoded using the method.

In these aspects of the invention, prototype preview audio generated by the gain block and any other processing is allowed to occasionally overload the representable range. When an overload or near overload occurs the preview audio is clipped to lie within the representable range and additional information to resolve the actual unclipped signal value is conveyed to the decoder in a data channel. When the decoder encounters in the preview audio a value which may be generated by clipping, it retrieves the information from the data channel, resolving whether the preview audio actually is clipped and if so what the unclipped value actually should be.

According to a ninth aspect of the invention there is provided a method of encoding an original digital audio pulse-code modulated "PCM" signal to a degraded digital audio signal having the same format as the original signal, the method comprising the steps of:

establishing restoration data for losslessly restoring the degraded signal;

establishing an encryption key;

encrypting the restoration data using the encryption key; and, placing the encrypted restoration data into least significant bit positions of the degraded digital audio signal.

Preferably, the method of the ninth aspect further comprises the steps of:

periodically embedding a data packet into the degraded signal by displacing signal bits, the data packet comprising a synchronisation pattern recognisable by a decoder;

burying the displaced signal bits using a lossless data-burying method; and, encrypting a portion of the degraded signal proximate to the data packet in dependence on the encryption key and on established encryption parameters.

Preferably, the displaced bits are of low significance, whereby the degraded audio signal sounds similar to the original audio signal.

In some embodiments the method further comprises the steps of:

generating an identifier or sequence number for each data packet;

establishing the encryption parameters in dependence on the identifier or sequence number;

encoding said identifier or sequence number into said data packet.

Preferably, the data packet comprises at least one configuration parameter for the lossless data-burying method, and the encrypted portion of the degraded signal overlaps a portion of the data packet containing the at least one configuration parameter. Additionally or alternatively, the lossless data-burying method operates in dependence on a configuration parameter g whose inverse is used multiplicatively in encoding the signal.

In some preferred embodiments, the step of encrypting the restoration data comprises exclusively-ORing at least some of the least significant bits of the degraded signal with a keystream generated by a stream cipher.

According to a tenth aspect of the invention there is provided a method of losslessly retrieving binary data from a stream of audio data bits representing a PCM digital audio signal, the method comprising the steps of:

establishing a set of bit positions within the stream that contain binary data;

retrieving binary data bits from the set of bit positions;

retrieving signal bits from the PCM digital audio signal using a method of lossless buried data; and, placing the signal bits into the set of bit positions;

receiving an encryption key; and, decrypting the bits within a second set of bit positions within the stream, wherein the second set intersects the set of bit positions containing binary data.

According to an eleventh aspect of the invention a method of decoding a degraded PCM stream comprises the steps of:

receiving the degraded stream;

establishing an encryption key for the stream;

searching for an instance of a synchronisation pattern within the degraded stream and thereby establishing the position of a data packet and a proximate portion of the degraded stream that is encrypted;

establishing encryption parameters for the proximate portion;

decrypting the proximate portion;

establishing configuration parameters for a lossless burying method and a corresponding lossless retrieval method;

applying the configured lossless retrieval method to the degraded stream, to furnish retrieved data bits and a partially reconstructed signal;

inserting the retrieved data bits into the bit positions that were occupied by the data packet in the partially reconstructed signal to furnish a fully reconstructed signal.

The step of establishing encryption parameters may comprise retrieving an identifier or sequence number from the data packet. Additionally or alternatively, the step of establishing configuration parameters may comprise retrieving said parameters from the data packet.

An encoder and a decoder are adapted to perform the method of the ninth and of the tenth and eleventh aspects, respectively, and a codec combines the encoder and decoder. A data carrier may comprise an audio signal encoded using the method.

As will be appreciated by those skilled in the art, various methods are disclosed for an encoder to embed a data stream into a quantised PCM digital audio signal and for a corresponding decoder to both retrieve the data stream and losslessly reconstruct the exact original audio. Some methods employ complimentary amplification and attenuation, while others employ gain redistribution. Pre-emphasis and soft clipping techniques are described as methods of losslessly reducing the peak excursion of the PCM audio signal. Also described is the lossless placing of data at predetermined positions within an audio stream.

Many of the methods described can be advantageously combined, and the steps associated with the method performed in varying order. Likewise, different methods of lossless buried data may be employed as appropriate in each method. Further variations and embellishments will become apparent to the skilled person in light of this disclosure.

BRIEF DESCRIPTION OF THE FIGURES

Examples of the present invention will be described in detail with reference to the accompanying drawings, in which.

DETAILED DESCRIPTION

Terminology

In our description we assume that audio signal values are scaled such that quantisation is quantisation to integer values. We represent the floor function by $\lfloor x \rfloor$, the largest integer $\leq x$ and the ceiling function by $\lceil x \rceil$, the smallest integer $\geq x$.

A range [a, b) denotes a range that does include the endpoint a, but is open at the other end, not including the endpoint b.

When we refer to lossless operations such as lossless filters or lossless matrices, we mean an operation on quantised data where the gross behaviour is like that of a filter or a matrix multiplication but where the detailed operation is such that the operation can be precisely inverted. Several filters and matrices having this property were disclosed in WO96/37024 "Lossless Coding Methods for Waveform Data" by Craven, P. G. and Gerzon, M. A. (December 2002). That is, from a knowledge of the quantised output of a processing block (and possibly prior values of the input and output), the exact quantised input values can be recreated. Typically this is done by breaking the operation down into a sequence of smaller steps, each of which can be inverted separately. The total operation can then be inverted by applying the inverse of each small step in reverse order.

A prime ' is usually used to denote a signal or component in a decoder corresponding to the unprimed signal or component in a corresponding encoder.

Gain Block

In some embodiments of the invention, an encoder receives a sampled and quantised input signal, applies a gain greater than unity, and requantises for transmission. A corresponding decoder applies the inverse gain, which is less than unity, and quantises again. Because the decoder multiplies the transmitted signal by a value less than unity, its output signal range is less than the transmitted signal range. As both signals are quantised to integer values, it follows that the decoder performs a many-to-one mapping. Therefore there must be some output signal values that can be represented by more than one transmitted signal value. Consequently, the encoder has choice over which signal value to transmit in order that an input signal value equal to one of those output values will be correctly reproduced by the decoder. This choice allows the encoder to embed additional information in the transmitted stream without affecting the final decoded value.

We refer to the transmitted signal with the additional information embedded as a 'composite signal'.

Figure 1:
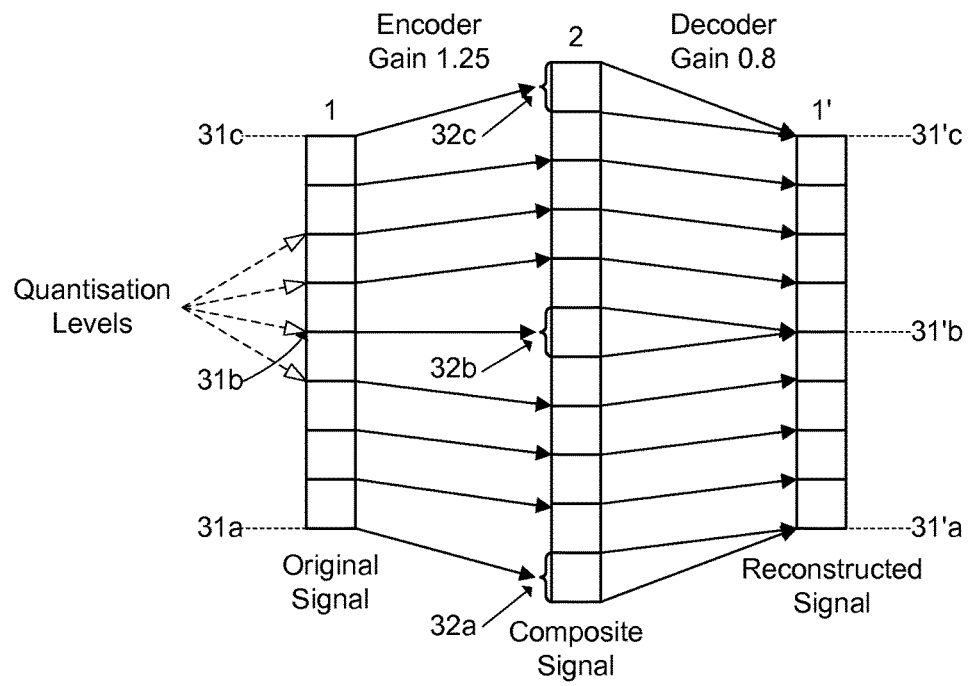
FIG. 1 shows the relationship between the quantisation levels of an original signal, an composite signal and a reconstructed signal in the case of an encoder applying of a gain 1.25 and a decoder applying the inverse gain 0.8.

This concept is illustrated in FIG. 1, which shows the possible quantisation levels of an original signal sample 1, a transmitted sample 2 and a final reconstructed sample 1'. In FIG. 1, an encoding gain of 1.25 is applied to the original signal sample 1 while its inverse, a decoding gain of 0.8, is applied to the composite sample 2 to produce the reconstructed sample 1'. Because the decoder also quantises, pairs 32a, 32b and 32c of consecutive quantisation levels of the composite signal would be quantised to the levels 31'a, 31'b and 31'c in the reconstructed signal. It follows that if any of the corresponding levels 31a, 31b and 31c is input to the encoder, the encoder will have choice of which element of the pair 32a, 32b, 32c to emit while preserving the requirement that the decoder must correctly reproduce a quantisation level 31'a, 31'b or 31'c equal to the level 31a, 31b or 31c presented to the encoder.

That choice may be made in response to a bit from a stream of additional data, in which case that bit has been buried in the transmitted composite signal and can be recovered by a decoder.

If the input signal is random, or otherwise if its histogram is smooth so that nearby quantisation levels occur with approximately the same probability, then the encoder of FIG. 1 will be able to bury on average one bit of additional data for every four samples of the original signal.

Figure 2:
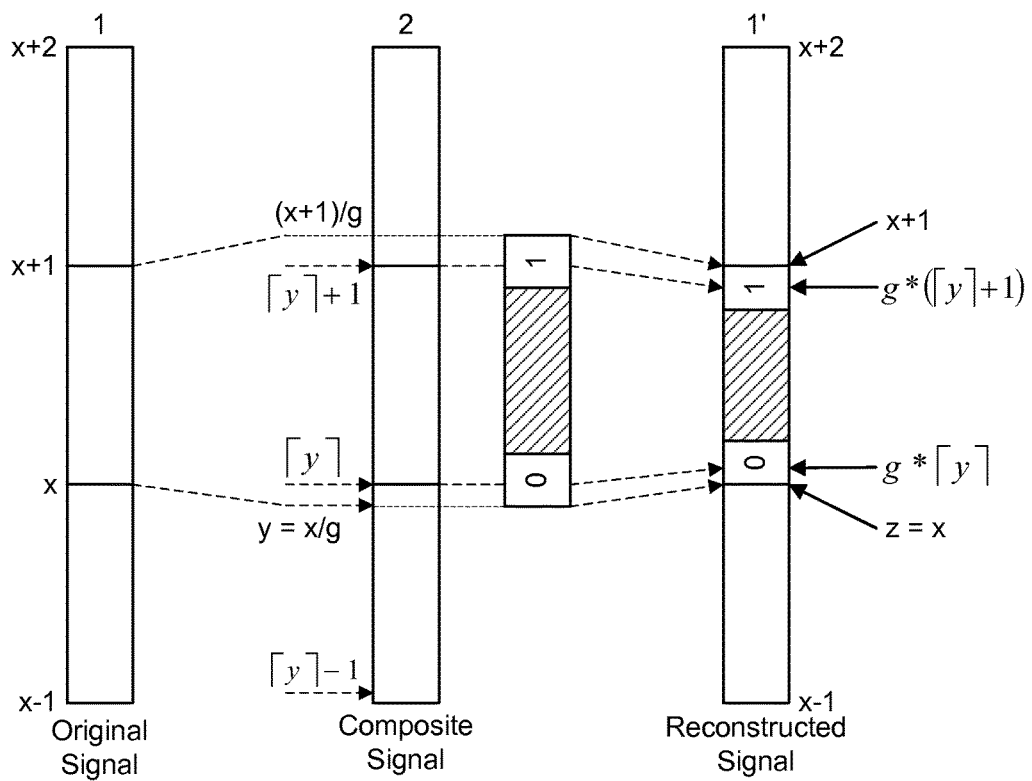
FIG. 2 is an expanded version of FIG. 1 showing also some of the intermediate values calculated internally within the encoder and decoder.

FIG. 2 expands on this concept. We choose a decoding gain g, where for convenience of explanation we assume $0.5 \leq g \leq 1$. Suppose that at a point in time the original signal has a value x and the composite signal has value y', then the decoder computes the reconstructed signal value z as $z = \lfloor gy' \rfloor$. We require that z=x, which condition implies that y' must lie between x/g and (x+1)/g. In addition, y' must have an integer value. Let y=x/g, then $y' = \lceil y \rceil$ is always a suitable choice, and sometimes $y' = \lceil y \rceil + 1$ is also possible. As already noted, when there are these two alternatives, a bit of additional data can be embedded. For example a 0 can be conveyed by choosing y'=⌊y⌋ and a 1 by choosing y'=⌊y⌋+1. The ability of embed a sequence of such bits provides a buried data channel.

The ability to embed a bit within a composite signal sample exists if and only if:

$$\lfloor y \rfloor + 1 < (x+1)/g$$

or, on rearranging $$\lfloor y \rfloor - x/g < 1/g - 1$$

or:

$$g\lfloor y \rfloor - x < 1 - g$$

If the encoder determines that this condition doesn't hold, then there is only one possible value for the composite signal value and so it cannot embed a data bit on this occasion.

The decoder can evaluate the above condition by multiplying the composite signal value y' by g in order to evaluate the output sample $z=\lfloor gy' \rfloor$, and then substituting x=z in the condition as stated above. Inspection of FIG. 2 will reveal that this condition is equivalent to the condition that the multiplied but unquantised value gy' is close to a quantisation level. If gy' is just above a quantisation level then a 0 has been conveyed, if just below then a 1 has been conveyed. If neither of these (i.e. if in the striped area shown in FIG. 2) then no data was embedded by the encoder.

Thus, in one embodiment, a first sequence of quantised audio sample values and a first data stream are together encoded to a second sequence of quantised audio sample values by executing the following steps for each sample value x from the first sequence:
  Establishing a gain value g where 0.5≤g≤1 that will be used in a corresponding decoder
  Retrieving the next sample x from the first sequence
  Computing y=x/g, and rounding up to ⌈y⌉
  If g*(⌈y⌉−y)≥1−g then appending the quantised value y'=⌈y⌉ to the second sequence;
  else taking one bit from the data stream and appending either y'=⌈y⌉ or y'=⌈y⌉+1 to the second sequence depending on whether the bit is 0 or 1

In one embodiment, a second sequence of quantised audio sample values is decoded to a third sequence of quantised audio samples and a second data stream by for each sample y' from the second sequence:
  Receiving a gain value g where 0.5≤g≤1
  Retrieving the next sample y' from the second sequence
  Multiplying the sample by g to form x'=gy'
  Computing the quantised value ⌊x'⌋ and appending that value to the third sequence
  Computing the fractional part frac(x')=x'−⌊x'⌋
  If frac(x')<1−g, outputting a 0 bit to the second data stream, Else if g≤frac(x'), outputting a 1 bit to the second data stream, Else outputting nothing to the second data stream If these steps are followed, the third sequence of quantised audio samples furnished by the decoding will be identical to the first sequence of quantised audio samples provided to be encoded, and the reconstruction is thereby lossless. Similarly the bits in the second data stream will be identical to the corresponding bits in the first data stream.

The operation has been described in terms of the quantiser in the decoder quantising towards −∞, but other decoder quantisation rules could be used with corresponding modifications to the encoder.

Variable Gain

A limitation that we have so far ignored is that the application of gain potentially restricts the signal range that can be presented to an encoder. In the example of an encoding gain of 1.25, if the composite signal is to be transmitted as 16-bit PCM, this composite signal will clip if audio signal presented to the encoder is also 16-bit and exercises more than 80% of its available signal range. Clipping is potentially unpleasant for a listener who hears the composite signal directly; it also invalidates lossless reconstruction method described above.

In practice a smaller encoding gain can be used and we shall also describe methods of ameliorating or circumventing these problems. Nevertheless it may be desirable to use a variable encoding gain that can be reduced, perhaps to unity, during the loudest passages of the input signal.

If the gain value is variable, the varying gain profile must be communicated from the encoder to the decoder. Gain values may be communicated from time to time, and if interpolation is used to create a smoothed gain profile then the encoder and decoder must both use the same interpolation method to ensure that on every sample they are using synchronised identical gain values. The gain values can conveniently be communicated within the data channel that has been created as described above. The gain value may be communicated infrequently (for example once every 100 ms) and may be coarsely quantised, provided that the encoder and the decoder use the same quantised value. Thus the communication of gain values can be arranged to consume only a small fraction (for example 2%) of the capacity of the buried data channel, leaving plenty of capacity for other data. Gain data needs to be transmitted before it is used: in practice this implies that the encoder needs to look ahead to future values of its input signal in order to determine a suitable gain value. Because the burying of bits in the stream is probabilistic, a decoder will usually buffer the buried data channel; this is another reason for the encoder to look ahead and generate gain values in advance of their being used.

It is rare for useful real audio to exercise peak level continuously; nevertheless it needs to be considered whether it may be necessary to set g to unity and if so, for how long. Since the buried data channel will have zero capacity in this circumstance, the buffering in the decoder and the look-ahead capability in the encoder must be sufficient to cover this situation.

At start-up, a predetermined gain value g<1 may be used by both encoder and decoder until buffers associated with the buried data channel have become adequately filled, at which point new gain values may be communicated from the encoder to the decoder using the buried data channel.

As noted, the restriction g≥0.5 above is not intrinsic to the invention and we now consider smaller values of g. If g=0.5, the condition recited above for embedding a data bit is always satisfied and the burying is no longer probabilistic: the buried data channel can carry one bit on every sample period. If ⅓≤g<½, more than one bit of data per audio sample can be carried, since on every sample at least two values of the composite signal y' will map to the same reconstructed value z, and sometimes there will be three such values of y'. When there are three such values $v_1$, $v_2$, $v_3$, either one bit b1 or two bits b1, b2 may be carried by the following simple scheme:
  if b1=0 then choose $v_1$ (one bit is carried)
    else if b2=0 then choose $v_2$ else choose $v_3$ (two bits are carried)

Thus a single bit can be carried with certainty on each sample, regardless of whether there are two or three values that map to the same reconstructed value z. A second bit is carried probabilistically, depending both on there being three values $v_i$ and on the value of b1. If $g=\frac{1}{3}$ and the stream of b1 bits is random, then the second bit is carried with probability ½, resulting in an average total data rate of 1.5 bits/sample.

Another way to view the same scheme is to consider it as equivalent to two nested encoder/decoder pairs, i.e. so that additional data is buried within a stream that already contains buried data. Thus for a total gain g in the range ¼≤g<½, one encoder/decoder pair would operate with g'=0.5 while the other would operate with g"=2g.

The skilled person will also know of more efficient ways to encode binary data into ternary decisions, giving efficiencies approaching $\log_2 3 \approx 1.58$ binary bits per sample for the case $g=\frac{1}{3}$. Similarly, efficient encoding to n-ary decisions allows higher data rates to be buried when $g<\frac{1}{3}$.

Using such optimal encoding of n-ary decisions, the data channel may achieve an average rate of $\log_2(g^{-1})$ bits per sample if g is an exact submultiple of unity, i.e. g=1/n, and if the fractional part of x/g is considered to be random. Or, if g is an exact power of 2, i.e. $g=0.5^m$ where $m \geq 1$, optimal efficiency can be obtained in a simple way: for example using the nested encoder/decoder pair model, in which only binary decisions need to be encoded.

Moreover if $g=0.5^m$ then burying is not probabilistic: it is guaranteed to bury m binary bits in each sample.

Gain Redistribution

If the decoding gain g is not an exact submultiple of unity, then not all quantisation levels in the composite stream are equally likely. For example, in the case ½<g<1 discussed earlier, a bit is buried or not depending on the original signal value, and those composite signal values which embed a bit of data have half the probability of occurring compared to values which don't, assuming that both the audio data and the data to be buried are essentially random. This redundancy results in a lower data rate: $(g^{-1}-1)$ bits per sample in the case ½<g<1, which is less than the data rate of $\log_2(g^{-1})$ bits per sample that might be expected from an optimally efficient method.

In many applications the desired capacity for the data channel is less than one bit per audio sample, so the question arises how to embed the data most efficiently so as to minimise the required encoder gain 1/g and thereby minimise the probability of overload in the composite signal, and also to minimise the change in perceived loudness of the composite signal relative to the original signal.

Accordingly, we now describe methods that allow such a low rate channel to be buried with optimal or near optimal efficiency.

One method, which may be inconvenient in practice, makes use of the ability to convert information efficiently between m-ary decisions and n-ary decisions, for some m and n. For example, as noted above, the gain block with a decoding gain $g=\frac{1}{3}$ allows a ternary decision to be optimally encoded with an average data rate $\log_2 3 \approx 1.58$ bits per sample. An encoder/decoder pair using this feature may be nested with another in which the encoder has a gain of ½ and the decoder has a gain of 2. The gain of 2 in the decoder implies a loss of one bit of signal resolution, which can be restored by taking one bit per sample from the data channel. By this means, a data channel of 0.58 bits per sample can be buried using an encoder gain of 1.5, whereas only 0.5 bits per sample could be buried at this gain using the more straightforward means first described.

Another method is to bury a bit or bits jointly within in a group of samples of the composite signal. We shall refer to such a group as a 'block', whether the samples be contiguous or not, and whether entirely within a channel of the composite signal or distributed between several channels of a multichannel signal.

It is trivially possible to efficiently bury a stream of data rate m/n bits per sample, where m<n, by dividing the samples into blocks of length n, selecting m samples from the n and embedding one bit into each of those m samples by applying an encoder gain of 2 to them. Alternatively, an efficient method as described above for efficiently burying b bits per sample can be applied to just m samples in a block of n, thus achieving a rate of (b·m)/n bits per sample with high efficiency. Typically, b=1 so min bits are buried per sample with a gain $2^{m/n}$.

However, straightforward application of the technique to a subset of the samples in a block will result in severe distortion as heard by the listener to the composite signal, caused by jumps in gain within each block; those samples that are processed will also be vulnerable to overload. Accordingly, some embodiments of the invention provide for data to be buried in a subset of the samples in a block, but then for further invertible transformations to be applied to the block to redistribute gain between samples so that the signal gains of individual samples are made more nearly equal.

Suppose we wish to scale two integer variables $x_1$, $y_1$ by factors k, $k^{-1}$. If we compute $k \cdot x_1$ and $k^{-1} \cdot y_1$ and then round to integer values as required, this is not invertible because of loss of information in the quantisation. An alternative is to make use of the matrix decomposition:

$$\begin{pmatrix} k & 0 \\ 0 & k^{-1} \end{pmatrix} = \begin{pmatrix} 0 & -1 \\ 1 & 0 \end{pmatrix} \cdot \begin{pmatrix} 1 & k^{-1} \\ 0 & 1 \end{pmatrix} \cdot \begin{pmatrix} 1 & 0 \\ -k & 1 \end{pmatrix} \cdot \begin{pmatrix} 1 & k^{-1} \\ 0 & 1 \end{pmatrix}$$

This allows us to scale two variables $x_1$, $y_1$ by factors k, $k^{-1}$ to furnish $k \cdot x_1$ and $k^{-1} \cdot y_1$ using three "lifting" operations and a transposition:

$$\begin{pmatrix} k & 0 \\ 0 & k^{-1} \end{pmatrix} \cdot \begin{pmatrix} x_1 \\ y_1 \end{pmatrix} = \begin{pmatrix} 0 & -1 \\ 1 & 0 \end{pmatrix} \cdot \begin{pmatrix} 1 & k^{-1} \\ 0 & 1 \end{pmatrix} \cdot \begin{pmatrix} 1 & 0 \\ -k & 1 \end{pmatrix} \cdot \begin{pmatrix} 1 & k^{-1} \\ 0 & 1 \end{pmatrix} \cdot \begin{pmatrix} x_1 \\ y_1 \end{pmatrix}$$

Figure 3:
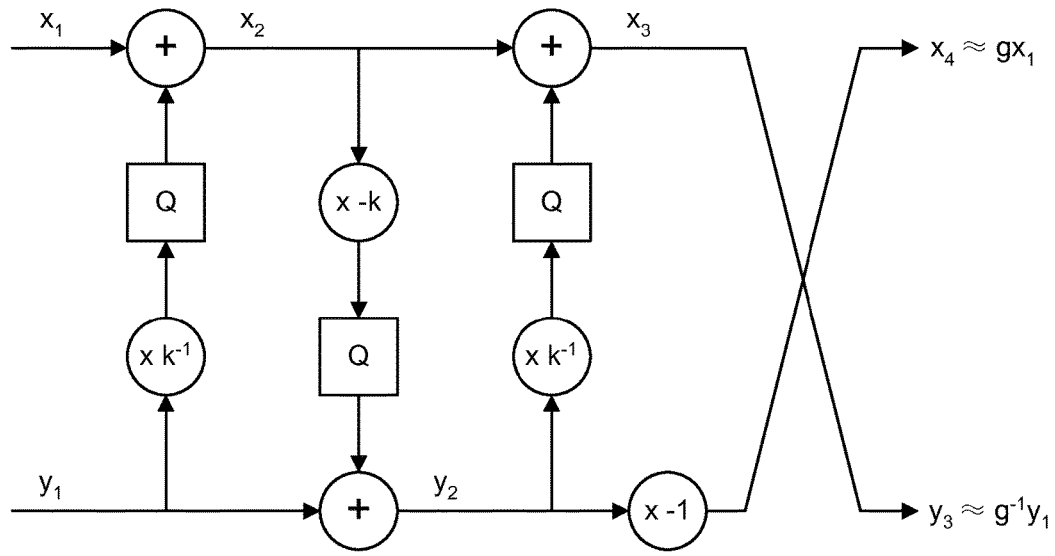
FIG. 3 shows how three lossless 'lifting' transformations may be used to apply a gain g to one signal sample and the inverse gain $g^{-1}$ to another sample.

The right hand side of this equation can be interpreted as three successive modifications of the sample pair $x_1$, $y_1$. Quantisation is also needed to prevent wordwidth increase: an encoder may perform three quantised lifting operations as shown in FIG. 3. These steps and the final transposition are expressed algebraically below:

$$x_2 = x_1 + Q(k^{-1} \cdot y_1)$$

$$y_2 = y_1 + Q(-k \cdot x_2)$$

$$x_3 = x_2 + Q(k^{-1} \cdot y_2)$$

$$(x_4, y_3) = (-y_2, x_3)$$

where $Q(\cdot)$ denotes quantisation. If we ignore the quantisations, the above sequence furnishes the pair $x_4 = k \cdot x_1$, $y_3 = k^{-1} \cdot y_1$, as required. The quantisations however do not prevent a decoder presented with $x'_4 = x_4$ and $y'_3 = y_3$ from recovering the original values. The decoder implements the inverse scaling by applying the inverse of each of the above operations, in reverse order:

$$(x'_3, y'_2) = (y'_3, -x'_4)$$

$$x'_2 = x'_3 - Q(k^{-1} \cdot y'_2)$$

$$y'_1 = y'_2 - Q(-k \cdot x'_2)$$

$$x'_1 = x'_2 - Q(k^{-1} \cdot y'_1)$$

Figure 4:
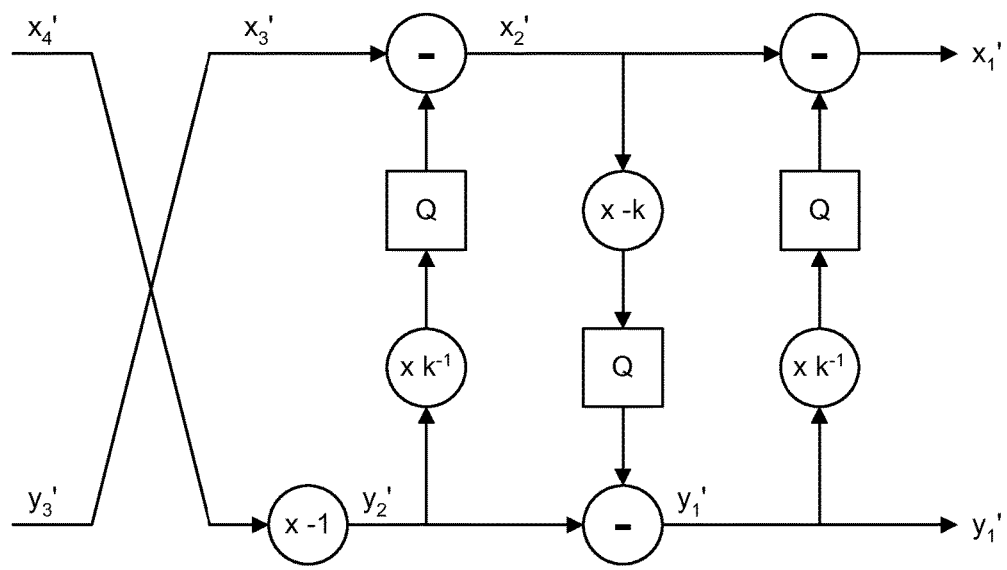
FIG. 4 shows how the operations of FIG. 3 may be reversed to reconstruct the original sample values $x_1$ and $y_1$.

The quantised lifting operations used by the decoder are shown in FIG. 4. This inverse scaling recovers the original samples $x'_1 = x_1$ and $y'_1 = y_1$ with bit-for-bit accuracy provided each quantisation used in the decoder matches the corresponding quantisation in the encoder. Subject to this requirement, any quantisation method, such as floor, ceiling or round-to-nearest may be used. For the best audio quality of the composite signal, dither may be used, synchronised between encoder and decoder. Quantisation with synchronised dither in lifting or Primitive Matrix Quantiser operations is explained in WO0060746 "Matrix Improvements to Lossless Encoding and Decoding" by P. G. Craven, M. J. Law and J. J. Stuart with reference to FIGS. 5a and 5b therein.

Real implementations using finite precision arithmetic will not usually be able to calculate and use an exact value for $k^{-1}$. Using a rounded approximate value will only slightly alter the implemented matrix which will not normally be a problem.

So long as both the encoder and decoder use the same approximation to $k^{-1}$, the decoder operation will still exactly invert the encoder operation.

The invertibility of a similar type of quantised matrix transformations is discussed in WO96/37024 "Lossless Coding Methods for Waveform Data" by Craven, P. G. and Gerzon, M. A., with particular reference to FIG. 22a and the equations on lines 4 and 14 of page 80. In that document, a "Primitive Matrix Quantiser" (PMQ) is considered to operate on a block consisting of co-temporal samples taken from the several channels of a multichannel signal, though the object is not gain redistribution in this case.

The quantised lifting operations shown in FIG. 3 and FIG. 4 are merely examples: various rearrangements are possible. For example, if it is known that $x_1$ is already quantised, the step:

$$x_2 = x_1 + Q(k^{-1} \cdot y_1)$$

can be replaced by:

$$x_2 = Q(x_1 + k^{-1} \cdot y_1)$$

and this is the form shown in WO96/37024.

In one embodiment, an encoder embeds data into the first sample of a block of n samples, using a method previously described, and in doing so applies a gain g' (where g<1) to the first sample of a block of n samples, then it applies a sequence of 2×2 transformation matrices to pairs of samples in order to redistribute the gain. That is, it applies the above scaling procedure (n−1) times, with k=g, firstly to the pair (sample$_1$, sample$_2$), then to the pair (sample$_1$, sample$_3$), and so on until finally between to the pair (sample$_1$, sample$_n$). Thus each of the samples 2, 3, . . . n acquires a gain $g^{-1}$, while sample 1 acquires a gain factor $g^{n-1}$ as a result of this scaling. However since sample 1 had gain $g^{-n}$ from the embedding process, sample 1 thereby acquires a final gain $g^{-1}$, and the gains of the samples thus have been equalised.

A corresponding decoder must concentrate the gain into the first sample (or more generally, into a subset of the samples) before retrieving the embedded data and thereby applying a gain $g^n$ to the first sample. In the example, the concentration process consists of applying the inverse scalings in reverse order, that is firstly to the pair (sample$_1$, sample$_n$), then to the pair (sample$_1$, sample$_{n-1}$), and so on until finally between to the pair (sample$_1$, sample$_2$).

An interesting case of the above is where $g = 0.5^{1/n}$, which results in precisely one bit of data being buried per block of n samples. With n=12, this will results in the composite signal being 0.5 dB louder than the original signal, which is almost unnoticeable perceptually, and will allow a data channel of capacity 3675 bits/s to be buried in one channel of a conventional CD signal sampled at 44.1 kHz, or 7350 bits/s in the two channels of a stereo signal.

The redistribution need not apply the same gain to all samples within a block: different values of k can be used in each matrix transformation. Thus a gain change may be implemented smoothly, without a step at each block boundary. The in this case the effective gain for the first sample is given by: $g_{tot} = \Pi_{i=1 \ldots n} g_i$ where $g_i$ is the gain of the $i^{th}$ sample.

"Sample 1" need not necessarily be the physically first sample in the block, and as already noted, data may be buried in more than one sample of the block before redistribution is applied.

Another variant is to apply the matrix transformations before burying the data. Thus, in the encoder, the first sample will temporarily have a gain of less than unity after the transformations have taken place, and will be restored to full magnitude when gain is applied in order to bury data. It is possible that quantisation noise in the composite signal will thereby be increased, while headroom requirements in the processing may possibly be reduced. The decoder must apply the two operations in reverse order, thus we may have either:

Encoder=(embed data; redistribute gain) Decoder=
(concentrate gain; retrieve data)

or alternatively:

Encoder=(concentrate gain; embed data) Decoder=
(retrieve data; redistribute gain)

For the case of an encoder applying a final gain of $g^{-1}$ to each of four samples $x_1$, $x_2$, $x_3$ and $x_4$, the two encoding possibilities are illustrated in matrix form as:

$$\begin{pmatrix} g^{-1} & 0 & 0 & 0 \\ 0 & g^{-1} & 0 & 0 \\ 0 & 0 & g^{-1} & 0 \\ 0 & 0 & 0 & g^{-1} \end{pmatrix} \begin{pmatrix} x_1 \\ x_2 \\ x_3 \\ x_4 \end{pmatrix} = \underbrace{\begin{pmatrix} g^3 & 0 & 0 & 0 \\ 0 & g^{-1} & 0 & 0 \\ 0 & 0 & g^{-1} & 0 \\ 0 & 0 & 0 & g^{-1} \end{pmatrix}}_{\text{Redistribute gain} \uparrow} \underbrace{\begin{pmatrix} g^{-4} & 0 & 0 & 0 \\ 0 & 1 & 0 & 0 \\ 0 & 0 & 1 & 0 \\ 0 & 0 & 0 & 1 \end{pmatrix}}_{\{\uparrow\} \; \uparrow \text{ Embed data}} \begin{pmatrix} x_1 \\ x_2 \\ x_3 \\ x_4 \end{pmatrix}$$

or alternatively:

$$\begin{pmatrix} g^{-1} & 0 & 0 & 0 \\ 0 & g^{-1} & 0 & 0 \\ 0 & 0 & g^{-1} & 0 \\ 0 & 0 & 0 & g^{-1} \end{pmatrix} \begin{pmatrix} x_1 \\ x_2 \\ x_3 \\ x_4 \end{pmatrix} = \underbrace{\begin{pmatrix} g^{-4} & 0 & 0 & 0 \\ 0 & 1 & 0 & 0 \\ 0 & 0 & 1 & 0 \\ 0 & 0 & 0 & 1 \end{pmatrix}}_{\{\uparrow\} \; \uparrow \text{ Embed data}} \underbrace{\begin{pmatrix} g^3 & 0 & 0 & 0 \\ 0 & g^{-1} & 0 & 0 \\ 0 & 0 & g^{-1} & 0 \\ 0 & 0 & 0 & g^{-1} \end{pmatrix}}_{\text{Concentrate gain} \uparrow} \begin{pmatrix} x_1 \\ x_2 \\ x_3 \\ x_4 \end{pmatrix}$$

Viewed as matrix algebra, it is trivial that these encoding methods are equivalent, but they are not precisely the same when quantised arithmetic is taken into account.

We will now illustrate encoding followed by precise inversion in a decoder by means of a slightly different example, where the elements of the redistribution process are performed both before and after the embedding of the data. The encoder performs:

$$\begin{pmatrix} g^{-1} & 0 & 0 & 0 \\ 0 & g^{-1} & 0 & 0 \\ 0 & 0 & g^{-1} & 0 \\ 0 & 0 & 0 & g^{-1} \end{pmatrix} \begin{pmatrix} x_1 \\ x_2 \\ x_3 \\ x_4 \end{pmatrix} =$$

$$\begin{pmatrix} 1 & 0 & -g & 0 \\ 0 & 1 & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & -g \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & -g^2 \\ 0 & 0 & 0 & 1 \end{pmatrix}$$

$$\begin{pmatrix} 1 & 0 & 0 & 0 \\ 0 & 1 & 0 & 0 \\ 0 & 0 & 1 & 0 \\ 0 & 0 & 0 & g^{-4} \end{pmatrix} \begin{pmatrix} 1 & 0 & 0 & 0 \\ 0 & 1 & 0 & 0 \\ 0 & 0 & 1 & 0 \\ -g & 0 & g^2 & 1 \end{pmatrix} \begin{pmatrix} 1 & 0 & 0 & g^{-1} \\ 0 & 1 & 0 & 0 \\ 0 & 0 & 1 & 0 \\ 0 & 0 & 0 & 1 \end{pmatrix}$$

data embedded here ↑

$$\begin{pmatrix} 1 & 0 & 0 & 0 \\ 0 & 1 & 0 & 0 \\ g^{-1} & g & 1 & 0 \\ 0 & 0 & 0 & 1 \end{pmatrix} \begin{pmatrix} 1 & 0 & 0 & 0 \\ 0 & 1 & -g^{-1} & 0 \\ 0 & 0 & 1 & 0 \\ 0 & 0 & 0 & 1 \end{pmatrix} \begin{pmatrix} 0 & 0 & 1 & 0 \\ 0 & 0 & 0 & 1 \\ 0 & -1 & 0 & 0 \\ 1 & 0 & 0 & 0 \end{pmatrix} \begin{pmatrix} x_1 \\ x_2 \\ x_3 \\ x_4 \end{pmatrix}$$

and the decoder performs:

$$\begin{pmatrix} g & 0 & 0 & 0 \\ 0 & g & 0 & 0 \\ 0 & 0 & g & 0 \\ 0 & 0 & 0 & g \end{pmatrix} \begin{pmatrix} x'_1 \\ x'_2 \\ x'_3 \\ x'_4 \end{pmatrix} = \begin{pmatrix} 0 & 0 & 0 & 1 \\ 0 & 0 & -1 & 0 \\ 1 & 0 & 0 & 0 \\ 0 & 1 & 0 & 0 \end{pmatrix} \begin{pmatrix} 1 & 0 & 0 & 0 \\ 0 & 1 & -g^{-1} & 0 \\ 0 & 0 & 1 & 0 \\ 0 & 0 & 0 & 1 \end{pmatrix}$$

$$\begin{pmatrix} 1 & 0 & 0 & 0 \\ 0 & 1 & 0 & 0 \\ -g^{-1} & -g & 1 & 0 \\ 0 & 0 & 0 & 1 \end{pmatrix} \begin{pmatrix} 1 & 0 & 0 & -g^{-1} \\ 0 & 1 & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & 0 \\ g & 0 & -g^2 & 1 \end{pmatrix}$$

$$\begin{pmatrix} 1 & 0 & 0 & 0 \\ 0 & 1 & 0 & 0 \\ 0 & 0 & 1 & 0 \\ 0 & 0 & 0 & g^4 \end{pmatrix} \begin{pmatrix} 1 & 0 & 0 & 0 \\ 0 & 1 & 0 & 0 \\ 0 & 0 & 1 & g^2 \\ 0 & 0 & 0 & 1 \end{pmatrix} \begin{pmatrix} 1 & 0 & 0 & 0 \\ 0 & 1 & 0 & g \\ 0 & 0 & 1 & 0 \\ 0 & 0 & 0 & 1 \end{pmatrix} \begin{pmatrix} 1 & 0 & g & 0 \\ 0 & 1 & 0 & 0 \\ 0 & 0 & 1 & 0 \\ 0 & 0 & 0 & 1 \end{pmatrix} \begin{pmatrix} x'_1 \\ x'_2 \\ x'_3 \\ x'_4 \end{pmatrix}$$

data retrieved here ↑

Thus the encoder performs a permutation with sign inversion, then four quantised lifting operations, embeds data into the modified sample $x_4$, and finally three more quantised lifting operations. At a gross level, the total effect is to increase the gain of each sample by a factor $1/g$. The decoder performs the inverses of these operations in reverse order. This is shown in the pseudocode below:

```
Encoder pseudocode:
    (S_1,S_2,S_3,S_4) := (x_3,x_4,-x_2,x_1);        // Permutation and sign
                                                      change
    S_2 := S_2 - Q_1(g^-1 * S_3);
    S_3 := S_3 + Q_2(g * S_2 + g^-1 * S_1);
    S_1 := S_1 + Q_3(g^-1 *S_4);
    S_4 := S_4 - Q_4(g * S_1 - g^2 * S_3);
    S_4 := S_4 * g^-4;                               // gain increase by embedding
                                                      data bit
    S_3 := S_3 - Q_5(g^2 * S_4);
    S_2 := S_2 - Q_6(g * S_4);
    S_1 := S_1 - Q_7(g * S_3);
    (X_1,X_2,X_3,X_4) := (S_1, S_2, S_3, S_4);       // Output values
Decoder pseudocode:
    (S_1, S_2, S_3, S_4) := (X_1,X_2,X_3,X_4);
    S_1 := S_1 + Q_7(g * S_3);
    S_2 := S_2 + Q_6(g * S_4);
    S_3 := S_3 + Q_5(g^2 * S_4);
    S_4 := S_4 * g^4;                                // gain reduction from retrieval
                                                      of data bit
    S_4 := S_4 + Q_4(g * Si - g^2 * S_3);
    S_1 := S1 - Q_3(g^-1 * S_4);
    S_3 := S_3 - Q_2(g * S_2 + g^-1 * S_1);
    S_2 := S_2 + Q_1(g^-1 * S_3);
    (x'_1,x'_2,x'_3,x'_4) := (S_4, -S_3, S_1, S_2); // Permutation and sign change
```

Following which the decoded values $(x'_1,x'_2,x'_3,x'_4)$ should be identical to the original sample values $(x_1,x_2,x_3,x_4)$. The quantisation functions $Q_1$ through $Q_7$ can be different if desired, but must be consistent between encoder and decoder.

Even if the gain g is exactly representable, the quantities $g^2$, $g''$ and $g^{-1}$ will generally not be. Inconsistencies between these quantities will affect the composite signal but will not affect lossless reconstruction provided that each instance uses the same value in the encoder and the decoder. In the case of an interpolated gain profile, this implies that the encoder must derive all its values relating to g from values that are communicated to the decoder, and that the decoder must use identical processing to generate identical copies of values used by the encoder.

The n×n matrix:

$$\begin{pmatrix} g^{n-1} & 0 & 0 & \ldots & 0 \\ 0 & -g & 0 & \ldots & 0 \\ 0 & 0 & g^{-1} & \ldots & 0 \\ \ldots & \ldots & \ldots & \ldots & \ldots \\ 0 & 0 & 0 & \ldots & g^{-1} \end{pmatrix}$$

has a determinant of unity. It is this property that allows it to be decomposed into a product of 'primitive' matrixes with unit diagonal elements where only one row or column has non-zero elements off the diagonal. Primitive matrices can by implemented by quantised lifting operations as explained above, and thus permit lossless reconstruction. The skilled person will be aware that the examples presented above show only a few of the many methods of decomposing a matrix having unit determinant into primitive matrices and thus allow gain redistribution according to the invention while permitting lossless reconstruction.

Dither

In some embodiments, the decoder adds a pseudorandom dither value r (having e.g. a uniform distribution over [0,1)) after taking a sample value y' from the second sequence (composite signal) but before multiplying by g in the gain block. Thus, $\lfloor x' \rfloor = \lfloor (y'+r)*g \rfloor$ is the value that will be appended to the third sequence (reconstructed signal).

The corresponding encoder of these embodiments subtracts the dither value r from the sample x after dividing by g. Thus $y=x/g-r$ and either $\lceil x/g-r \rceil$ or $\lceil x/g-r \rceil+1$ is the value that is appended to the second sequence.

From time to time the encoder may communicate a seed for a pseudo random generator to the decoder so that the encoder and decoder may use identical synchronised values of r. The seed can be multiplexed with other data and carried in advance over the buried data channel.

Adding this pseudo random dither value potentially improves the quality of the audio in the second sequence of composite audio sample values, which may or may not be important. It also randomises operation of the gain block, meaning that the data channel has capacity even if the fractional part of x/g is not random but constant.

Least Significant Bit (LSB) Data Channel

Some applications may benefit from the ability to bury data in a manner such that it can be retrieved immediately on start-up, without waiting for a gain value g to be established. Embodiments of the invention achieve this, usually by placing the data into the least significant bit positions of some or all samples of the composite signal, the corresponding lsbs of the original signal being conveyed using the buried data channel.

Assuming for example that the original signal has sixteen bits, the invention as described so far may be operated on the top fifteen bits of the signal, the sixteenth bit being treated separately. The sixteenth bit of a composite signal sample may carry the sixteenth bit of the original signal, or it may carry a data bit, the corresponding bit from the original signal being carried in the data channel provided by the invention.

Figure 5:
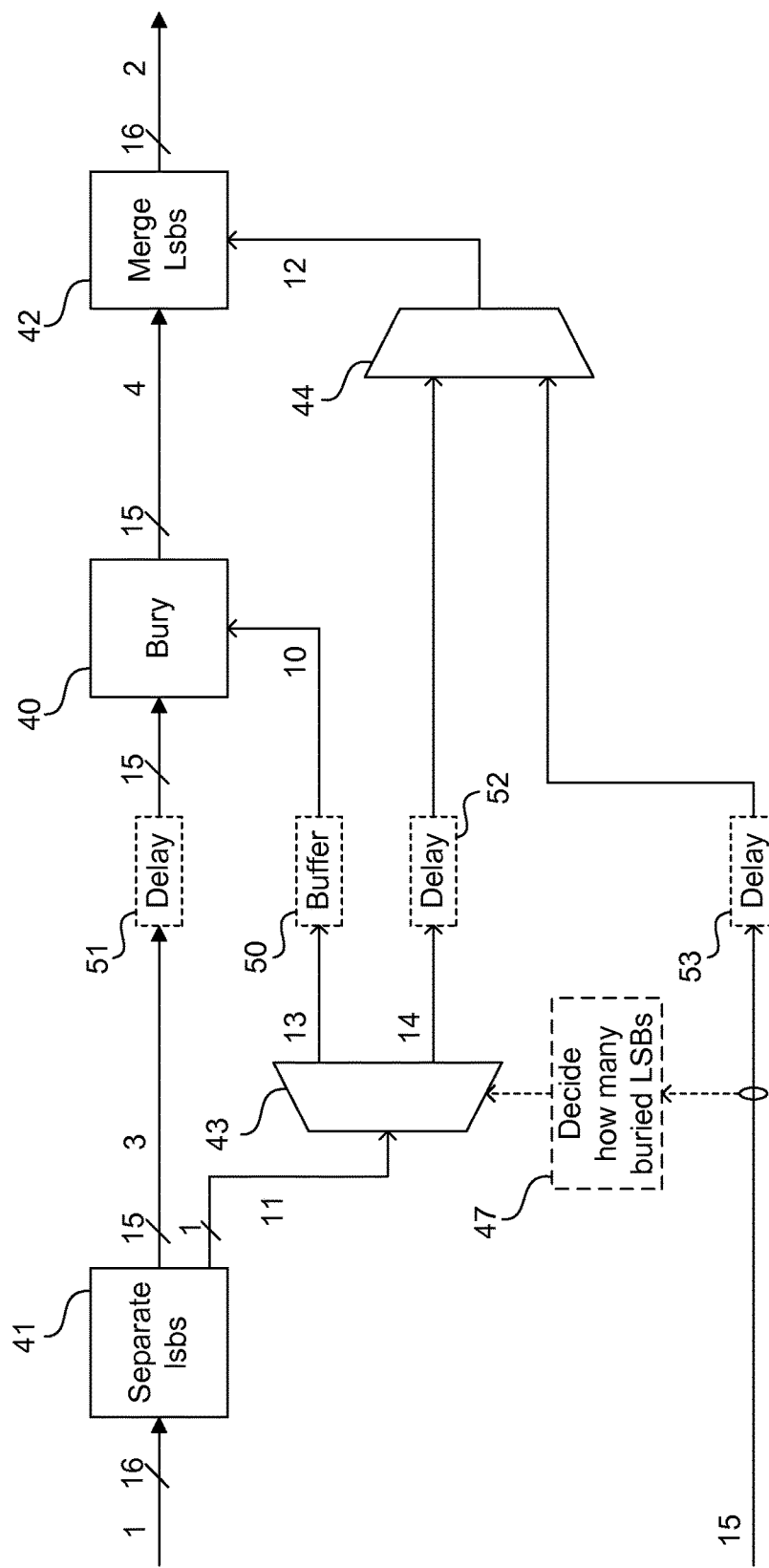
FIG. 5 shows how, in an encoder, data bits may replace least significant bits (lsbs) of predetermined samples of a digital audio signal, the displaced original lsbs being carried according to the invention by applying gain to the bits of higher significance.

An encoder performing this process is illustrated in FIG. 5, wherein an original signal 1, sixteen bits wide, is fed to a separator 41 which furnishes a stream 3 containing the fifteen most significant bits separately from the stream 11 of least significant bits (lsbs). The stream 3 is passed to a burying unit 40 which buries data 10 according to the invention to produce a 15-bit composite signal 4. The lsb stream 11 is split by the demultiplexer 43 into an lsb stream 13 which feeds the data channel 10 buried according to the invention, and the remaining lsbs 14 are sent to a multiplexer 44 which combines them with other data 15 into a 1 bit wide stream 12 that is merged by 42 with the fifteen-bit-wide stream 4 to produce a sixteen bit composite signal 2.

In the case that the data stream 15 has a variable bit rate, the demultiplexer 43 may also optionally accept an input from a decision unit 47 which monitors the data rate and adjusts the proportion of stream 11 that is sent as buried data 10, so that the data rate of the remaining stream 14 plus the rate of stream 15 does not exceed the maximum data rate, such as one bit per sample period, of the stream 12. Optionally the gain 1/g of burying unit 40, and hence the capacity of data path 10 may also be varied.

In case the burying unit may temporarily have insufficient capacity to the bury the data rate of the stream 10, a first-in-first-out (FIFO) buffer 50 may be provided. Considering also the decoder of FIG. 6, it would be normal to include a complementary buffer 50' within the decoder, arranged so that the delay of buffer 50 plus the delay of the complementary buffer 50' equals a constant value d. The delay unit 52 is then provided, also with a delay d, so that the lsbs 11 are recovered in the decoder as a stream 11' with the same delay irrespective of whether they are sent through the path 10 or the path 12. Delay unit 51 also provides delay d, so that in the composite signal the msbs 3 are correctly aligned with lsbs that have been conveyed along paths 10 and 12. A similar balancing delay unit 53 in the data path 15 may or may not be desirable, depending on the application.

Figure 6:
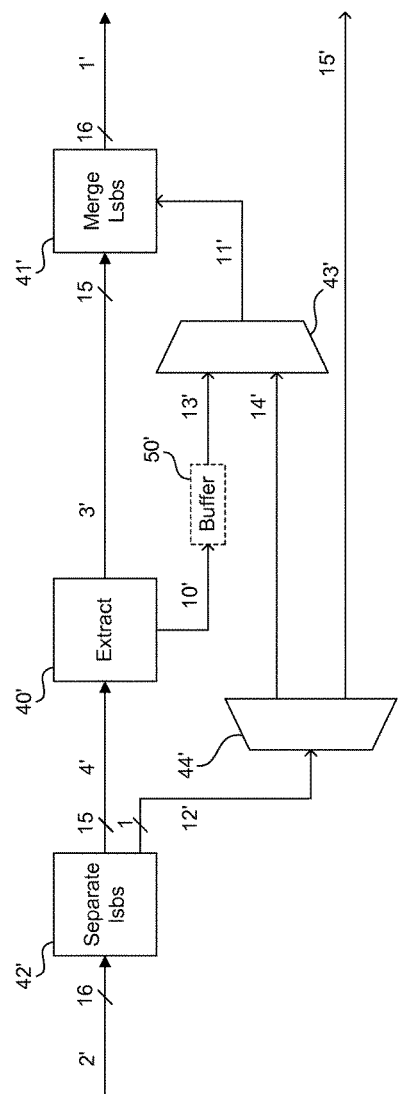
FIG. 6 shows a decoder corresponding to the encoding architecture of FIG. 5.

In the decoder of FIG. 6, the operations of FIG. 5 are inverted in reverse order. Separator 42' separates the composite signal 2' into its most significant bits 4' and its lsbs 12'. Retrieval unit 40' retrieves buried data 10' and the fifteen most significant bits 3' of the restored signal 1'. The stream of composite lsbs 12' is demultiplexed 44' into bits 15' that provide a replica of the data 15 that was provided to the encoder, and bits 14' that represent signal lsbs. The bits 14' are then multiplexed 43' with the signal lsbs 10' that were buried, to furnish the complete stream of signal lsbs 11' that is then merged 41' with the signal msbs 3' to provide the reconstituted signal 1'.

Figure 7:
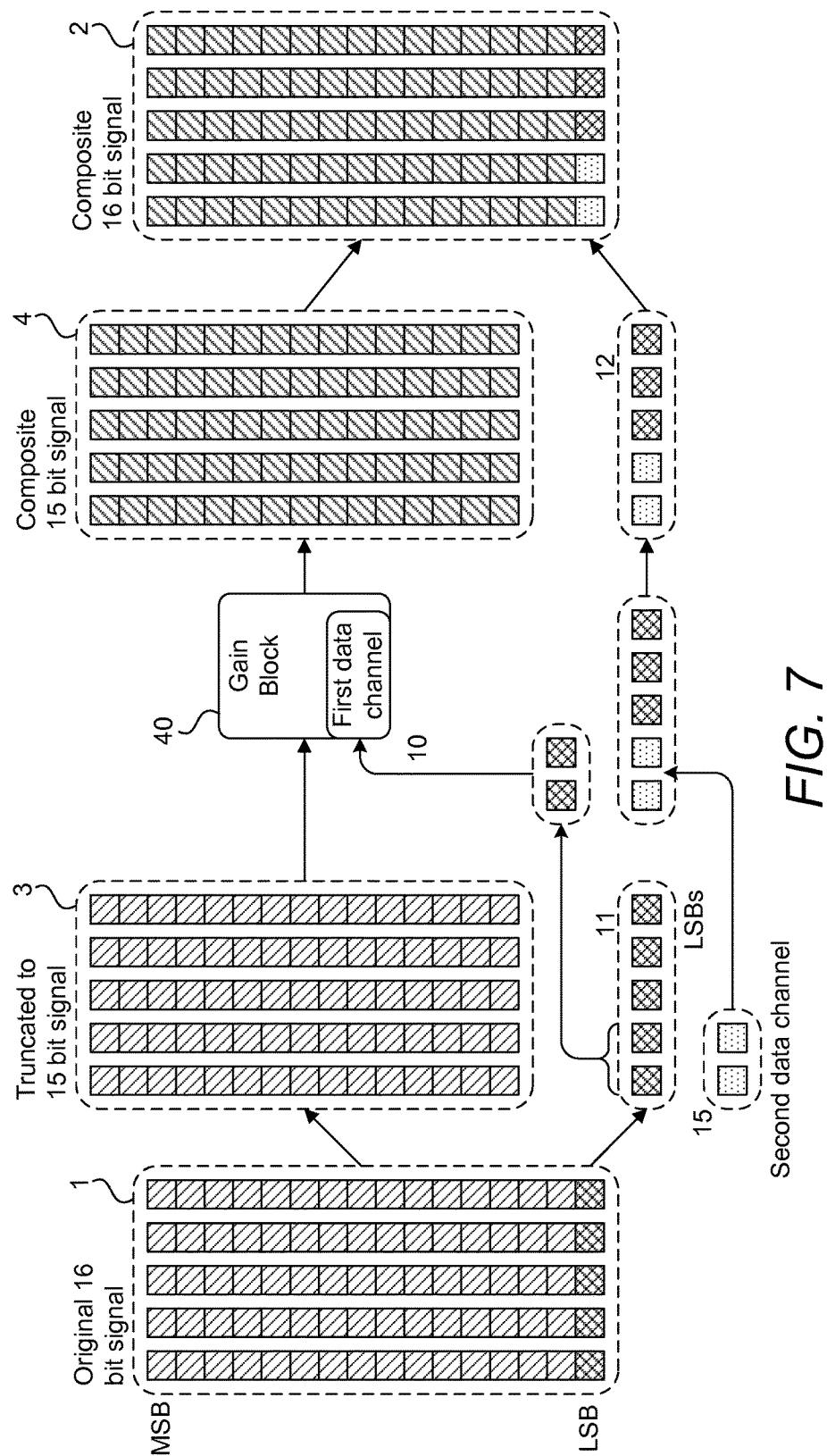
FIG. 7 shows the relationship between the signal and data bits in the encoder of FIG. 5.
Figure 8:
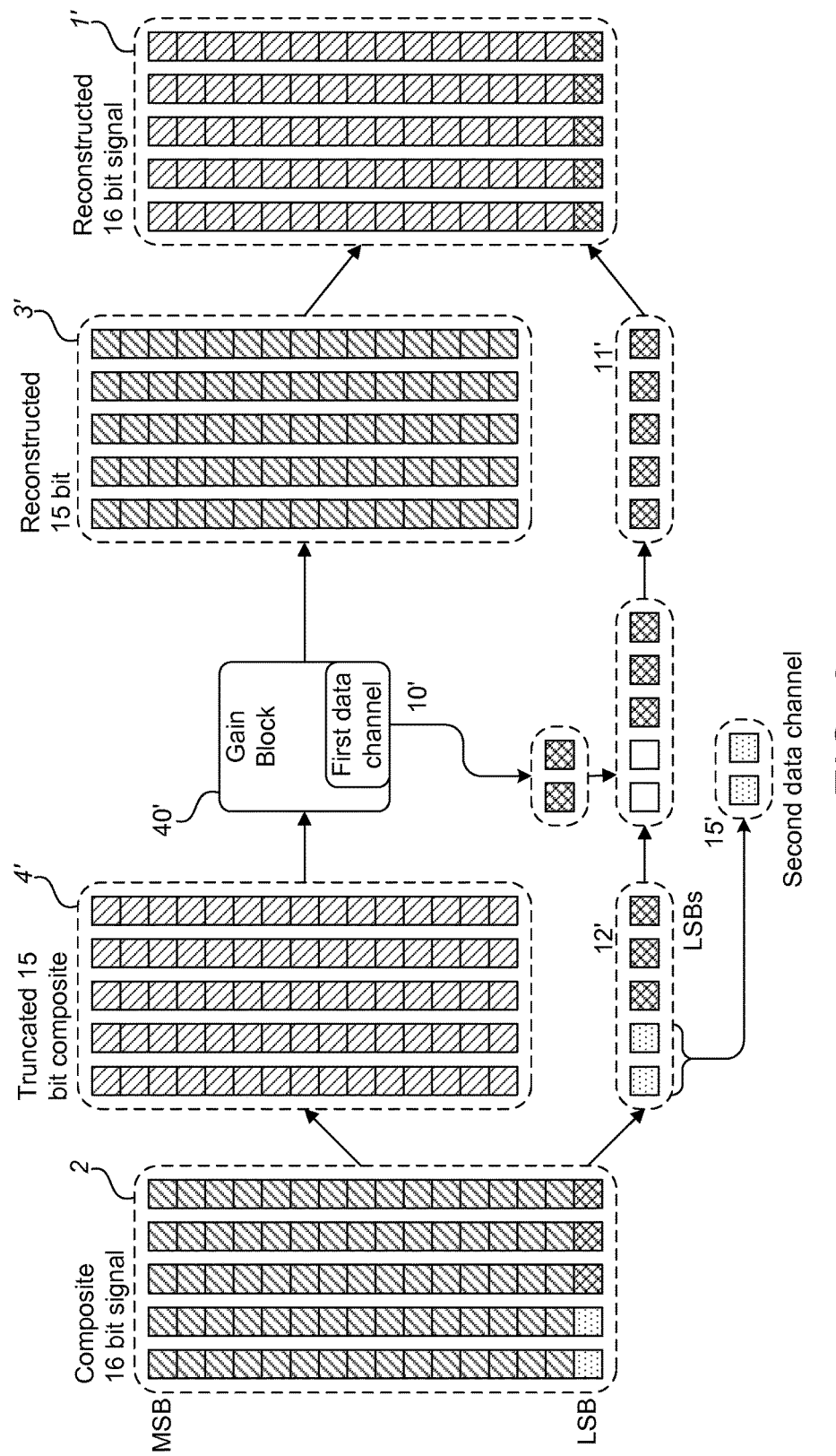
FIG. 8 shows the relationship between the signal and data bits in the decoder of FIG. 6.

Details of the separation and merging operations of FIG. 5 and FIG. 6 are shown in FIG. 7 and FIG. 8 for the example of encoding a block of five original 16-bit signal samples 1. Their five respective lsbs 11 are separated, leaving five truncated 15-bit samples 3 which are encoded by the burying unit 40 to the five 15-bit intermediate composite signal samples 4. Two bits of the lsbs are fed 10 to the gain block to be conveyed as data by the buried data channel. The space vacated by those two bits is then available for use by two bits of other data 15. Five bits 12 comprising three original lsbs and the two bits of other data are then combined with the five 15-bit processed samples 4 to provide five 16-bit final composite samples 2.

In the decoder the process is reversed. The top fifteen bits 4' of the composite signal samples 2 are fed to the retrieval unit 40', which reconstitutes the top fifteen bits 3' of the reconstructed signal 1' and also furnishes the bits 10' conveyed in the buried data channel. The five lsbs 12' of the composite signal samples 2 are now considered. Two of them 15' are furnished as bits of the "lsb data channel". The other three are lsbs of the original signal, which are now combined with the two original signal lsbs 10' that were conveyed by the buried data channel. The resulting five bits 11' form the lsbs of the reconstructed signal 1'.

In short, the lsb data channel operates by conveying data in bit positions that would normally be used to convey signal bits, the displaced signal bits then being conveyed in the buried data channel. The above example is for illustration only, and a different pattern of displaced bits can be used. However, it would be normal to displace only least significant bits in order to minimise the disturbance to the composite signal. Further, it may be preferred to randomise the data bits conveyed in the lsb data channel in order to avoid introducing audible tones into the composite signal. As a further precaution against tones, in case the original signal 1 was quantised to 15 bits, a one-bit binary dither can be added to the to the original signal 1 before processing, a synchronised identical 1-bit dither being subtracted from the reconstructed signal 1'.

The ability to convey other data in the lsbs of the composite signal provides a second data channel, which we will call an "lsb data channel", to distinguish it from the "gain data channel" provided by the burying unit 40.

An advantage of the lsb data channel is that its data can be retrieved immediately, without waiting for the decoding of the buried data channel to become established. This ability helps resolve some mutual dependencies. For example, if the gain g is conveyed as buried data then it may be difficult to start decoding partway through an encoded stream, since to retrieve the buried data requires knowledge of g. This circularity is resolved if instead the information that allows the gain profile g to be reconstructed is conveyed instead in the lsb data channel.

In the diagrams of FIG. 5 and FIG. 6, it is assumed that displaced lsbs 10, 10' are the only data that are buried by the main burying unit. Clearly, additional multiplexers can be used to allow external data to be fed directly to the burying unit, without displacing Isbs.

The pattern of signal bit positions that will be used for the Isb data channel may be predetermined, or may be flexible. An advantageous format provides a predetermined pattern of bit positions in which configuration information may be conveyed from the encoder to the decoder, the configuration specifying additional signal bit positions that may be used for the Isb data channel, depending on the data rate of the information to be sent over that channel, and perhaps varying dynamically during a single stream. Further, some of the predetermined bit positions may be filled with pre-determined bits, to make a synchronisation pattern that can be recognised by a decoder that begins decoding partway through a stream.

The FIFO buffer 50 in FIG. 5 may not be needed if the encoding and decoding operates on blocks of signal data that are large enough to guarantee that, over a block period, the number of data bits to be buried does not exceed the burying capacity of the burying unit 40 using an acceptable value of the gain g. If a FIFO buffer is used in the encoder, then its occupancy from time to time may be conveyed as part of the configuration information to allow a decoder that begins decoding partway through a stream to initialise its own FIFO buffer 50' correctly.

Buffers 50 and 50' have been described as FIFO for ease of explanation, but alternative buffering algorithms may also be adopted. One possibility is for buffer 50' to be a last in first out buffer, which advantageously allows the decoder to start up and operate without requiring configuration information communicating buffer occupancy. The complementary algorithm for buffer 50 is a "conveyor" discussed in WO2010038000, Craven, P. G. & Law, M., "Improved lossy coding of Signals", with particular reference to FIGS. 7 and 8 therein and the text starting on page 26.

Clearly, a decoder that begins at an arbitrary position within a stream cannot properly reconstruct original samples until has acquired sufficient configuration information. The decoder may route the composite signal to its output until the fully reconstructed signal stream is available.

Overload

In some embodiments of the invention, a prototype composite signal is computed as described above, with the possibility that it may occasionally exceed the range that the signal format can represent. The actual composite signal cannot do so, so this prototype composite signal needs to be clipped to always lie within the representable range.

This clipping process removes information from the composite signal, because it is a many to one mapping. In order to correctly invert the various processing operations and correctly regenerate the original audio, the decoder needs to be supplied with extra information to reconstruct the unclipped composite signal. As the invention provides a data channel from encoder to decoder, this channel can be used to convey the required additional information along with the other parameters for reconstruction.

Figure 9:
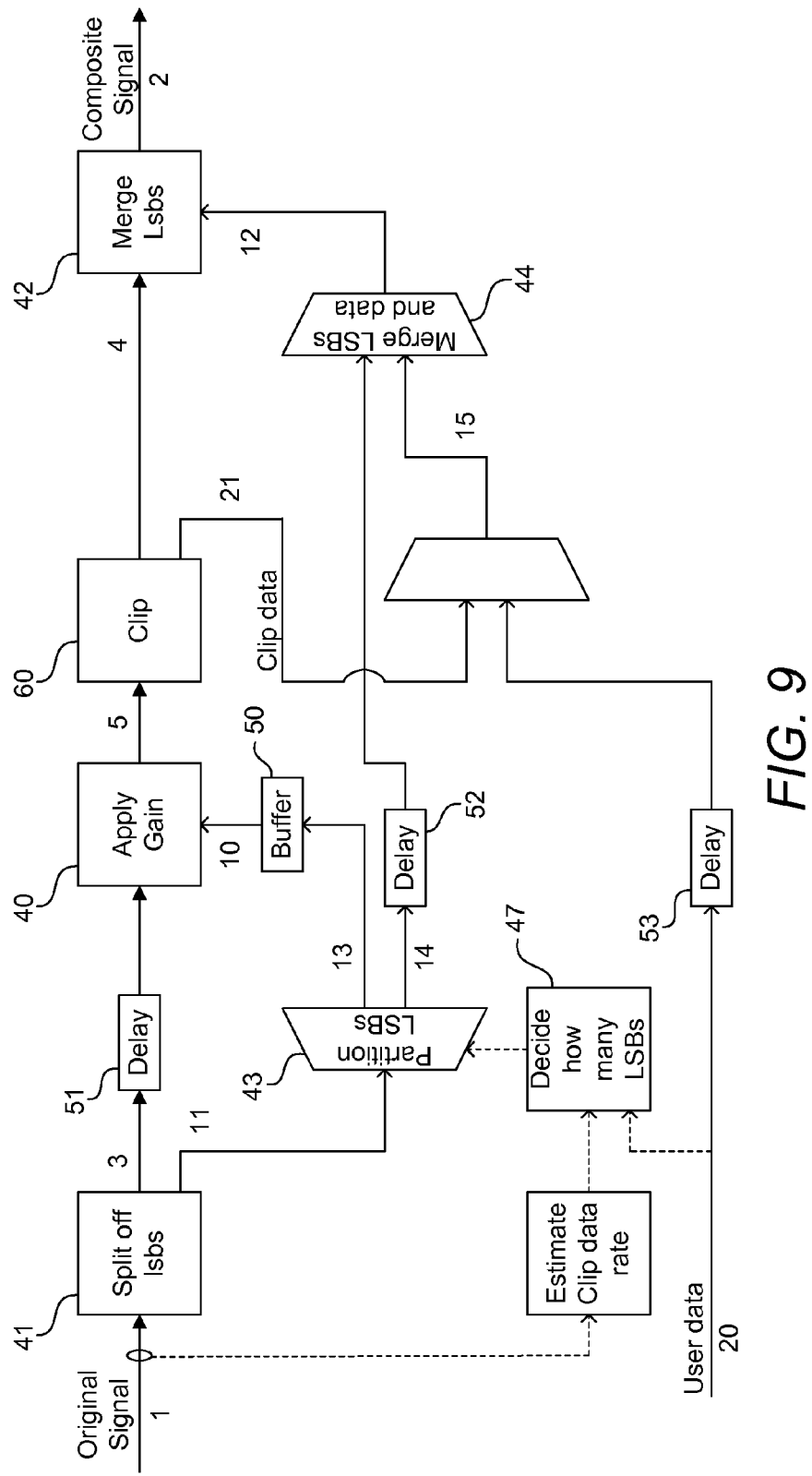
FIG. 9 shows an encoder that compresses the signal range of a prototype composite audio signal to avoid overload when the signal is transmitted over a standard channel.

FIG. 9 is an enhancement of FIG. 5 in which the burying unit 40 processes the most significant bits 3 of the original signal to furnish a prototype composite signal 5 which is passed to clipper 60. The clipped signal 4 is merged with least significant bit information 12 to furnish the composite signal 2 in the manner already described with reference to FIG. 5. The data 21 required to reconstruct unclipped signal values is multiplexed with other data 20 to provide the stream 15 of bits that will be multiplexed 44 with original signal Isbs to furnish the Isbs 12 of the composite signal.

Figure 10:
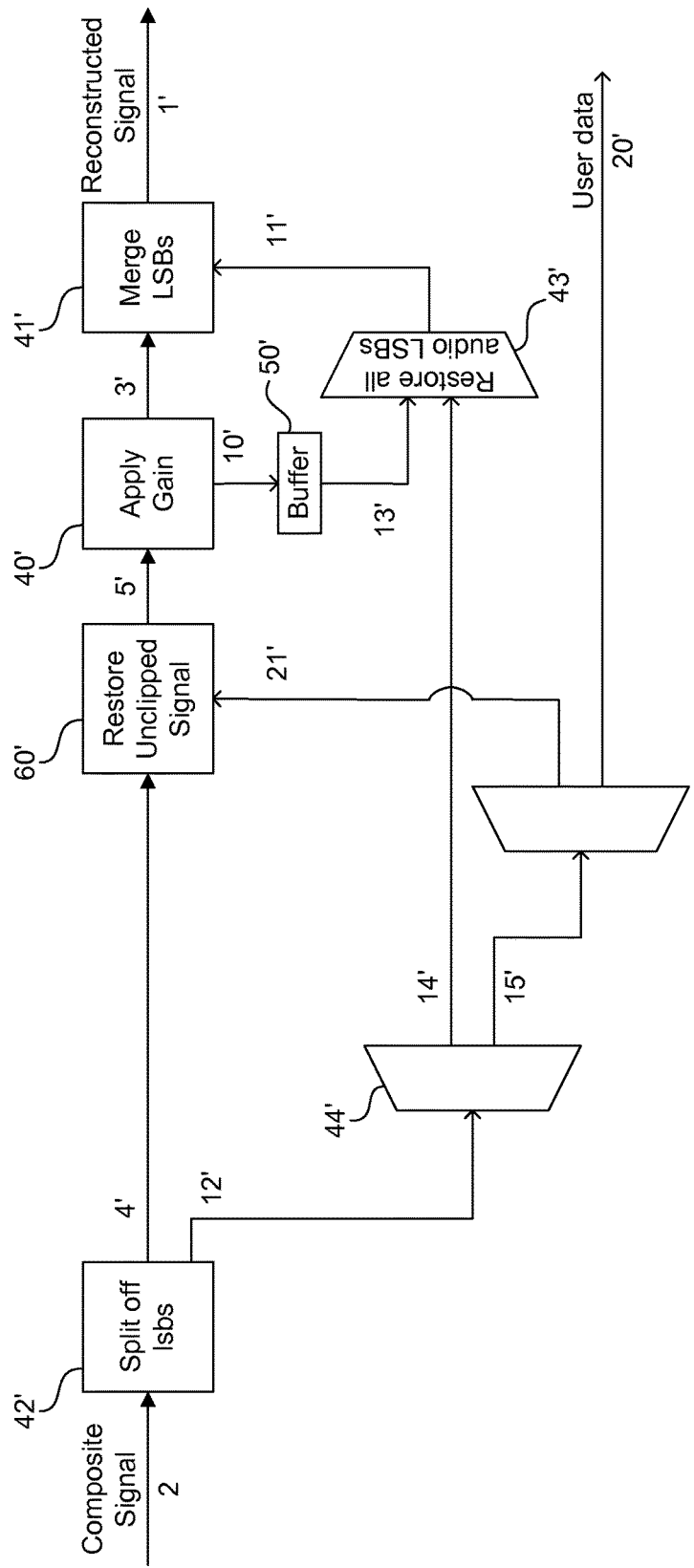
FIG. 10 shows a decoder corresponding to the architecture of FIG. 9.

The corresponding decoder, FIG. 10, is similarly an enhancement of FIG. 6, the new feature being that the data 15' furnished by the Isb data channel now includes clip restoration data. Hence this data 15' is sent to a further demultiplexer which separates clip restoration data 21' from additional data 20'. The restoration data 21' is fed to the clip restoration unit 60' which uses it to restore any clips in the signal 4', the restored signal 5' being provided to the data retrieval unit 40'.

The clip restoration signal 21 will generally be of a 'bursty' nature, and its instantaneous data rate may exceed that of the Isb data channel. One solution to this problem is to provide a buffer in the path 21, and a complementary buffer in the path 21', with arrangements as previously described in relation to the buffers 50 and 50' to provide a constant combined delay of the two buffers and a compensating equal delay in the signal path 4. Another solution is to interpret the flow diagrams of FIG. 5, FIG. 6, FIG. 9 and FIG. 10 as operating not on individual signal samples but on blocks of signal samples. The block size, perhaps several thousand samples, will be chosen sufficiently large to smooth the 'burstiness' so that the total clip restoration data in a block is always less than the total burying capacity of the buried data channel.

It may be preferred to configure the buryer so that data is not buried in samples that have clipped.

We now discuss the form of the clipper 60. A simple method to furnish a 15-bit signal sample v, is to apply the clip function $$v=\mathrm{clip}(u)=\min(\max(u,-16384),+16383)$$

to the unclipped signal value u. Thus, the clip function is applied to the stream 5 to furnish the stream 4. If the value v is in the unclipped range $-16384<v<16383$ then $v=u$ and no restoration data are required. Otherwise, the restoration data may consist simply of the unclipped value u represented as a binary number of perhaps 16 bits. The skilled person will be aware of more efficient encodings of the unclipped sample value, especially in view of the sign information from v and the a priori knowledge that v cannot lie in the interior of the unclipped range; moreover v's maximum absolute value is approximately $16384/g$ if the only processing of the signal is that in the embodiments described so far.

Another possibility is to implement a soft clip: a function that maintains unity slope up to a signal value threshold that is somewhat less than the maximum representable value, and then reduces its slope smoothly so that larger signals are reduced. A clipped signal value v that is greater than the threshold may then represent more than one unclipped value u, and the clip restoration data thus needs to specify which is the correct value u: this is generally a choice from a small number of values and can be efficiently encoded.

Figure 11:
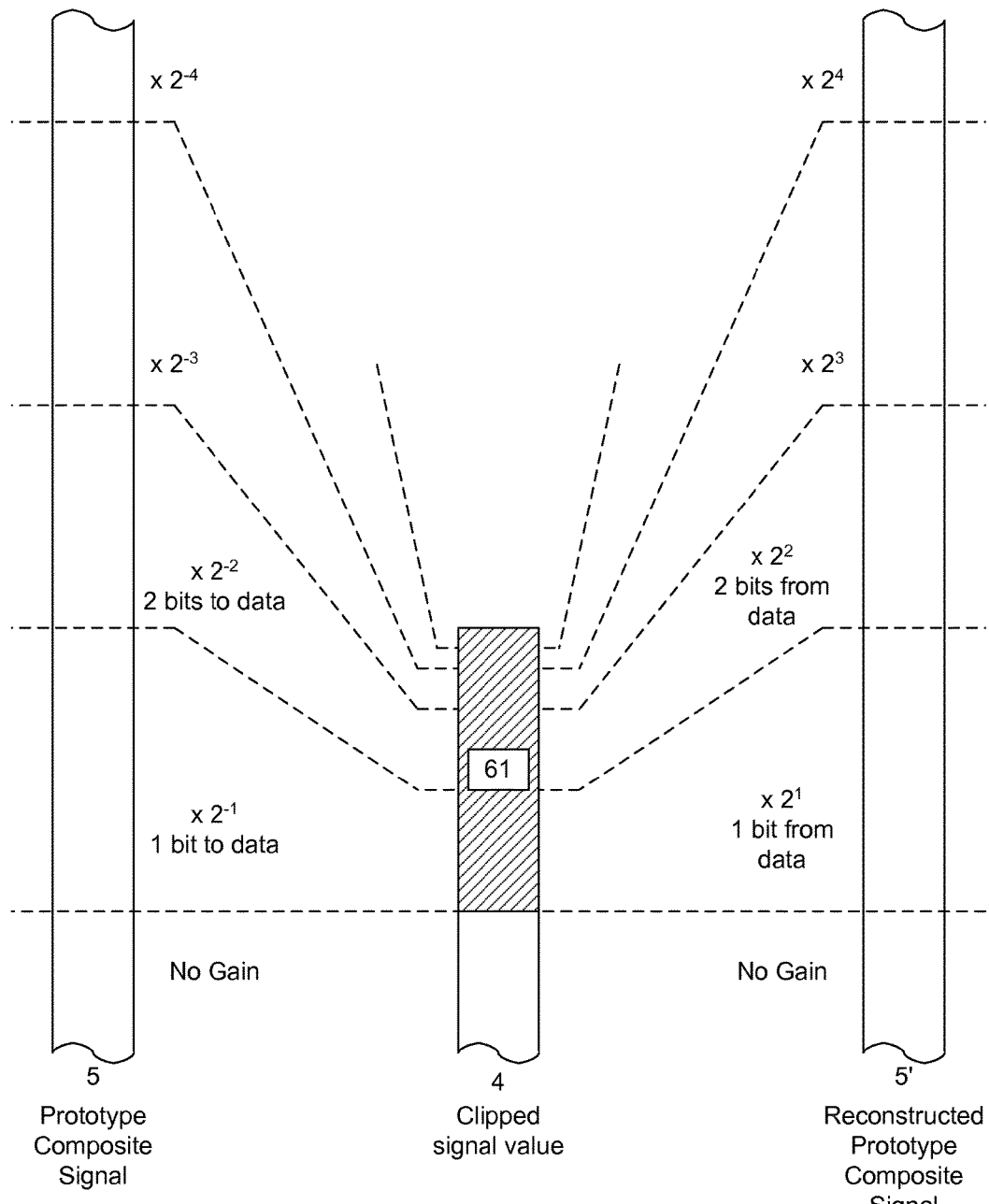
FIG. 11 illustrates a mapping of signal ranges performed by the encoder of FIG. 9.

An example of such a scheme is shown in FIG. 11, which shows the relationship between an unclipped value 5, the corresponding clipped value 4, and the restored value 5'. In this case the clip function is piecewise linear and the slopes and lengths of the linear segments have been chosen to permit simple and efficient encoding. A range of sample values 61 (henceforth called the compression zone) at the top of the representable range of the composite signal are used to represent unclipped values covering this range plus many unrepresentable values.

Each value in the compression zone represents a power of two unclipped values, with a data channel according to the invention being used to convey exactly which of those unclipped values was present. Soft clip functionality is achieved by starting at a low power of 2 and increasing the power of 2 nearer the top of the compression zone, as shown in the picture.

A similar process is followed implementing another compression zone at the bottom of the representable range for negative clips.

Reversing this process, the decoder establishes if the composite signal sample value lies in a compression zone. If so, it applies the inverse mapping to the encoder mapping, pulling in the required number of bits from the data channel to resolve the ambiguity in the many to one mapping.

Different choices of compression zone mapping will have different bandwidth requirements over the data channel, depending on the actual distribution of the unclipped audio and will have different audible effects on the composite signal. It is sensible for several mappings to be defined, the encoder selecting which to be used in each block of audio in dependence on the unclipped composite signal and communicating the choice of mapping to the decoder over the data channel.

Pre-Emphasis

Some embodiments of the invention provide an advantageous combination of previous embodiments with lossless pre-emphasis, a technique described more fully in the above mentioned publication WO96/37024, especially the text starting at page 71 line 21. The concept is also explained in "Pre-emphasis for use at 96 kHz or 88.2 kHz" by J. R. Stuart, published by Acoustic Renaissance for Audio 1996, available for download at www.meridian.co.uk/ara/dvd_96k.pdf, or alternatively in "Coding Methods for high-resolution Recording Systems" by Stuart, J. Robert, presented at Audio Engineering Society Convention103 (September 1997), paper Number:4639.

Lossless filters such as those shown in FIGS. 6a through 6d of WO96/37024 may be configured as pre-emphasis filters by setting the coefficients of the filters $A(z^{-1})$ and $B(z^{-1})$ to give a rising response at high frequencies. Each of these filters has transfer function $$\frac{1+A(z^{-1})}{1+B(z^{-1})},$$

which has a first impulse response of unity. It can be shown (c.f. page 33 lines 9-23) that a minimum-phase filter of this type must have a frequency response whose decibel (dB) value averages to 0 dB over the Nyquist frequency range. Hence a rising response at high frequencies implies a gain of less than 0 dB at low frequencies, as shown for example in FIG. 21c of WO96/37024.

It is explained in the above-cited documents that typical audio signals have more energy at low frequencies than at high frequencies. A lossless pre-emphasis filter that boosts high audio frequencies moderately while reducing the low frequencies will therefore almost always reduce the total energy content of a music signal. Typically the peak excursion will also be reduced, though this may not be the case with signals that have been manipulated to maximise loudness, and perhaps are already clipped to the maximum level that the format can handle. For high resolution audio, sampled at 88.2 kHz or higher, FIG. 21c of WO96/37024 shows the response of a lossless filter:

$$1+\frac{34}{16}z^{-1}+\frac{23}{16}z^{-2}+\frac{2}{16}z^{-3}-\frac{2}{16}z^{-4}$$

that provides at least 8.19 dB reduction at all frequencies below 20 kHz. Thus, even on material with high treble energy, it is likely that after processing with this filter, a factor 2 of gain could be applied in an encoder without causing overload. This filter reduces low frequencies by 13.2 dB so the composite signal would be 7.2 dB quieter than the original if this filter were used in combination with an encoder burying one bit per sample according to the invention.

More satisfactory would be to use a lossless pre-emphasis filter, probably an infinite impulse response (IIR) filter, that had a response substantially constant from 0 to 20 kHz, then with a modest rise towards the Nyquist frequency, for example approximating a linear rise with a slope of 1½ dB/kHz. The precise specification can be adjusted to have gain −7 dB or −8 dB at low frequencies, thus giving a composite signal 1 dB or 2 dB quieter than the original if one bit per sample is buried according to the invention, using $g=\frac{1}{2}$ and hence an encoder gain of 2.

In this way, PCM audio material at a high sampling rate can support a high rate of lossless buried data in a particularly simple manner: the refinements of gain redistribution and LSB data channel will generally not be required and a simple form of gain block may also be used, since in the case $g=\frac{1}{2}$ the encoding method reduces to shifting the audio signal words left by one bit and placing one bit from the data stream into each least-significant-bit position thus vacated. An optional enhancement is to randomise the data stream first, for example forming the exclusive-or with a pseudorandom bitstream known to the decoder, so that any repeating patterns in the data stream are not heard as tones in the composite audio.

Figure 12:
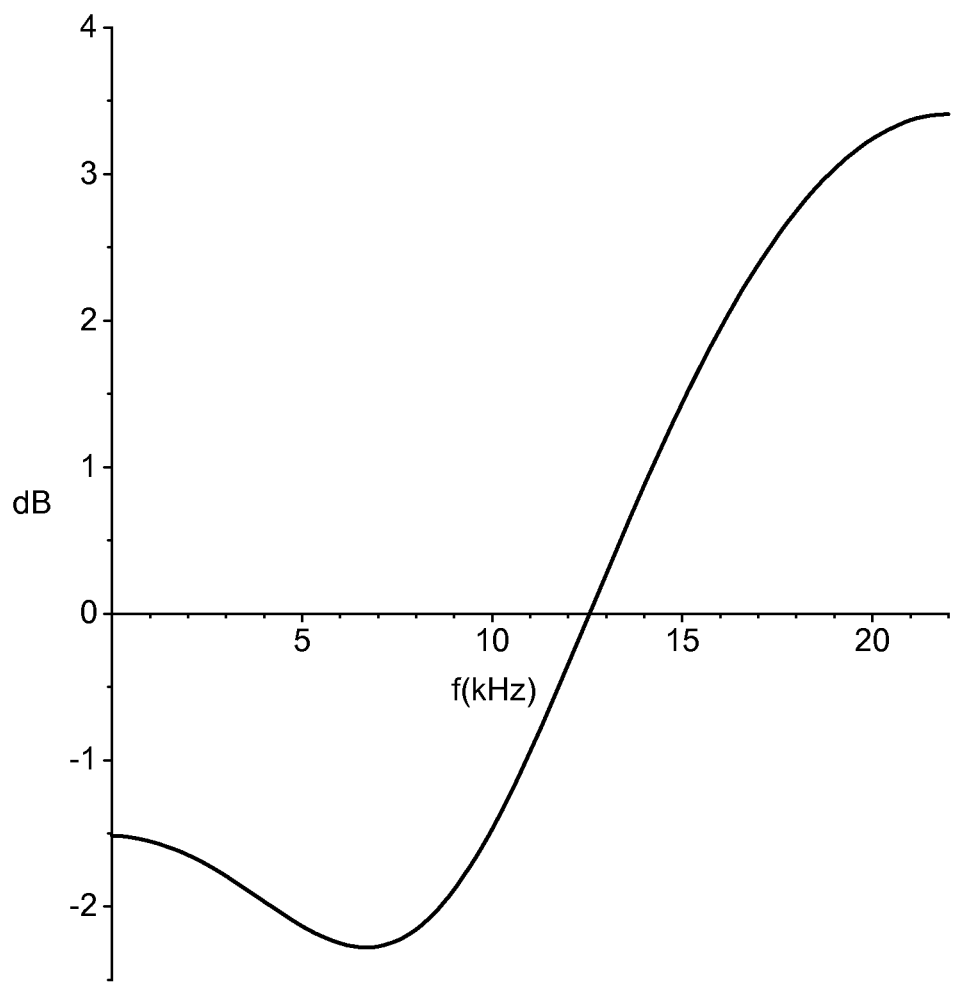
FIG. 12 shows the frequency response of a lossless pre-emphasis filter.

Audio material sampled at 44.1 kHz and having high treble energy content may not present the opportunity to bury such large amounts of data, and a more cautious approach is needed. An example is the song "So, what ?" by Metallica, a commercial release of which has 8333136 16-bit samples, spanning the range −32767 to +32766. Of these, 42626 or approximately 0.5% are within 0.5 dB of clipping. FIG. 12 shows the frequency response of the lossless pre-emphasis filter $1-0.32z^{-1}+0.16z^{-2}$, which has a gain at low frequencies of −1.5 dB. On applying this filter, two samples out of the eight million clip.

If now one bit is buried per four samples using the gain block and gain redistribution methods, the gain of the composite signal is increased by 1.5 dB so the composite signal then has the same loudness as the original: 8396 samples then clip. Naively, each clipped sample could be encoded as full scale (−32768 or +32767) in the composite signal, and the unclipped value could be represented as 17 bits within the data stream. In this case slightly less than 7% of the capacity of buried data channel would be occupied by information required to restore the clipped samples. Alternatively, the clipping can be handled more efficiently using the overload methods.

There is choice as to whether or not the attenuation at low and middle audio frequencies provided by the pre-emphasis should match the gain provided by the buried data encoder. In the above example, the 1.5 dB loss from the pre-emphasis could be partially restored by burying one data bit per six samples, resulting in a gain of 1 dB in the buried data encoder and a composite signal 0.5 dB quieter than the original. The number of clipped samples in the composite signal is then 1717, the restoration data now occupying 2.1% of the buried data channel if encoded naively as described above.

As noted, the overload method allows lossless reconstruction despite occasional clipping of the composite signal. It will therefore often be satisfactory to use overload and pre-emphasis methods in combination, with a fixed gain g and a fixed pre-emphasis filter. Alternatively, g may be varied: if desired the pre-emphasis filter may also be varied and in a preferred embodiment the low frequency gain of the filter is arranged to track variations in g so that the loudness of the composite signal remains in an approximately constant relationship to the loudness of the original signal.

Also as noted, the gain block can be greatly simplified if operated with a $$\text{fixed value} = \frac{1}{2},$$

while the gain redistribution permits easy implementation when $$g = \left(\frac{1}{2}\right)^{\frac{1}{n}}$$

where n is integer. It is also easy to switch from $$g = \left(\frac{1}{2}\right)^{\frac{1}{n}}$$

to g=1 should this become necessary to avoid overload in a peak passage. Such a discontinuous jump in g could produce an unacceptable discontinuity in the composite signal, but its effect can be mitigated by a simultaneous change in the pre-emphasis filter.

An architecture that seeks to minimise audible gain changes to the composite signal, and to minimise audible clicks in the case of discontinuous changes to g, will now be described with reference to the encoder shown in FIG. 13 and the corresponding decoder shown in FIG. 14.

Figure 13:
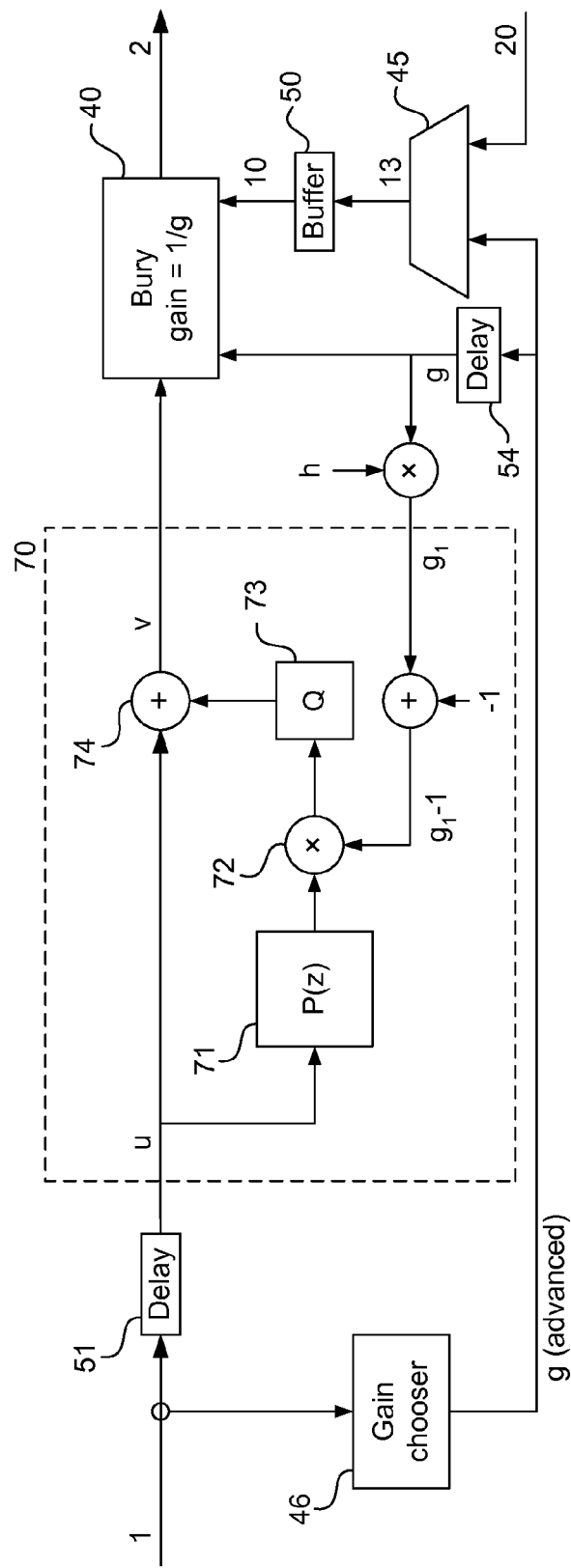
FIG. 13 shows an encoder according to the invention incorporating pre-emphasis.

In FIG. 13, the original signal passes through first delay unit 51, then the pre-emphasis unit 70, and then the data burying unit 40 which operates in accordance with previous embodiments of the invention to produce the composite signal 2. The gain g that will be used by the data burying unit is chosen by the chooser unit 46 which monitors the signal prior to the delay 51 and is thus able to reduce g in advance of a peak in the signal that might otherwise overload. Information that allows the gain profile g to be reconstructed is combined with original externally provided data 20 in the multiplexer 45, and after buffering 50 is embedded in the composite signal by data burying unit 40. In FIG. 13 and FIG. 14, no distinction is made between g itself and the information needed to construct it: any required conversion from one form to the other can be performed in the multiplexer 45 and the demultiplexer 45'.

The second delay unit 54 matches the buffering delays in 50 & 50' in conveying gain profile information through the buried data channel, in order that a decoder may retrieve the gain profile in correct alignment with the signal samples that it processes. Unit 51 should provide a delay at least as long as unit 54, and preferably longer if smooth changes are required in advance of a signal peak.

The gain value g controls operation of the burying unit 40; g is also passed to the pre-emphasis unit 70 after multiplication by h, so that the value passed is $g_1 = h \cdot g$. The intention is that h should be the total gain of the encoder at low and middle audio frequencies, independently of changes in g. Suitable choices include h=1, or h=0.944, which results in an attenuation of 0.5 dB in the composite signal as in one of the above examples. If it is desired for other reasons to make h vary dynamically, this too can be accommodated by feeding information relating to h as a further input to the multiplexer 45, again with compensation for buffering delays.

The input u to the pre-emphasis filter 70 is fed to a prediction filter 71 which predicts the current sample value from past sample values only. The simplest such filter is $P(z) = z^{-1}$ but other predictors may be used, such as $P(z) = 2 \cdot z^{-1} \cdot z^{-2}$ or $P(z) = 3 \cdot z^{-1} - 3 \cdot z^{-2} + z^{-3}$, or indeed any other FIR or IIR predictor having a gain of substantially unity and a group delay of substantially zero at low frequencies. The output of filter 71 is multiplied 72 by $(g_1 - 1)$ (which is negative), then quantised in quantiser 73 and added to the input u to furnish the output v of the pre-emphasis filter.

Thus the gain of the filter 70 from its input u to its output v is $1 + (g_1 - 1) \cdot P(z)$, which approximates $g_1$ at low frequencies by virtue of the assumptions on P. Taking into account the gain 1/g from the data burying unit 40, the composite signal sees a low frequency gain of $g_1 \times 1/g$, which equals h, as required. It is the quantiser 73 that enables the pre-emphasis 70 to be losslessly inverted, as explained in WO96/37024.

In the case that g changes discontinuously, the input to filter 71 does not see the discontinuity, so if the original signal contains only low frequencies we can approximate $P(z) \approx 1$ and so the relationship:

$$v \approx u + (g_1 - 1)u = g_1 \cdot u = h \cdot g \cdot u$$

holds on a sample-by-sample basis. The composite signal is then given by:

$$g^{-1} \cdot v \approx g^{-1} \cdot h \cdot g \cdot u = h \cdot u$$

and so the discontinuous change in g produces negligible discontinuity in the composite signal. This will not be true for original signals having larger high frequency content, but in that case any click from the discontinuity is more likely to be masked by the signal itself.

If $P(z) = 2 \cdot z^{-1} - z^{-2}$ and $g_1 = 0.84$, then the response of the pre-emphasis filter 70 is $1 - 0.32z^{-1} + 0.16z^{-2}$, as used in an example above and plotted in FIG. 12.

Figure 14:
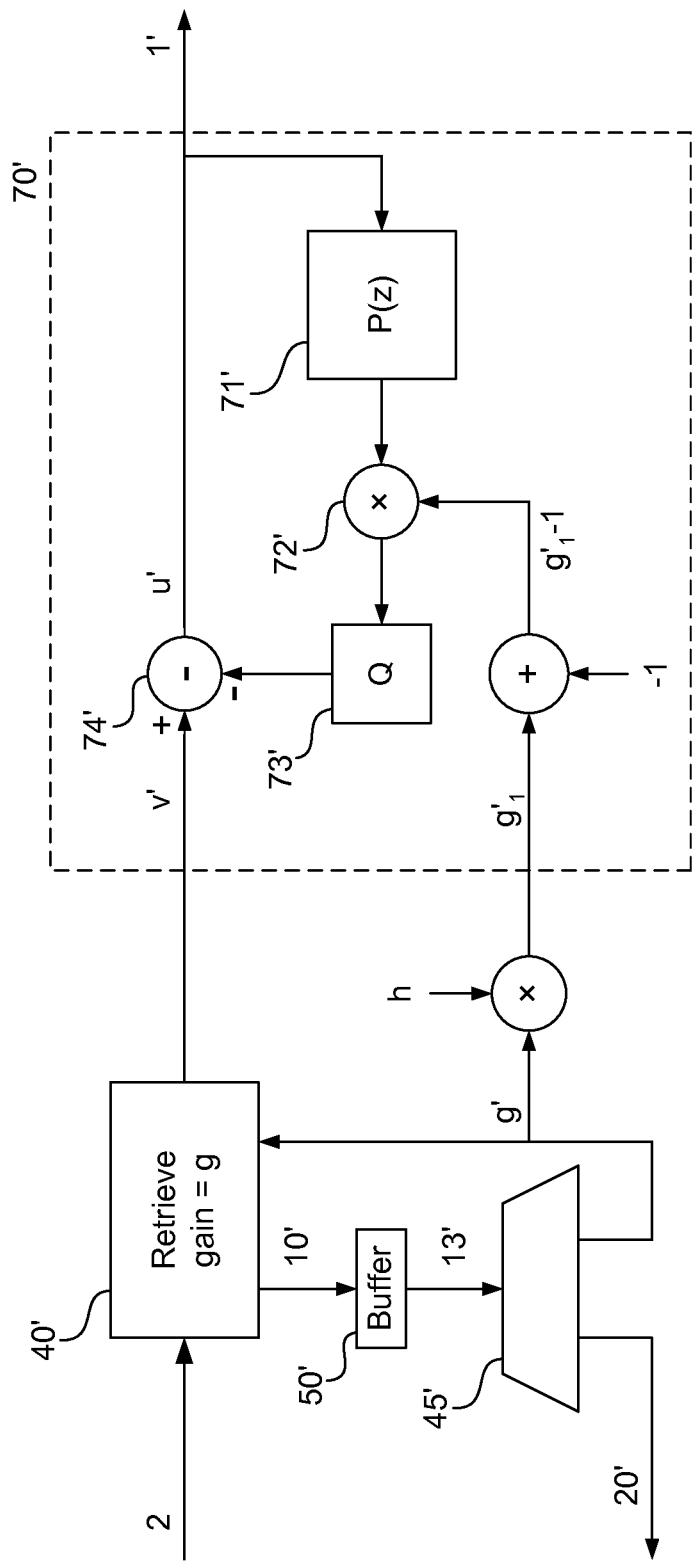
FIG. 14 shows a decoder corresponding to the encoder of FIG. 13.

In the decoder of FIG. 14, the retrieval unit 40' operating with gain g' performs the inverse operations to the burying unit 40 to furnish the signal V', a replica of v, and data that were buried including, potentially, information relating to g'. The demultiplexer 45' separates this information from other data and decodes it if necessary to furnish the value of g' itself. The other data is delivered as 20', a replica of the original data 20 that was provided to the encoder. The value g' is then used by the retrieval unit 40' to process subsequent samples, and also by the de-emphasis filter 70'.

Within the de-emphasis filter 70', predictor 71' is a copy of predictor 71 and quantiser 73' is likewise identical to quantiser 73 in FIG. 13. Analysis reveals that provided that the signals V and $g'_1$ in FIG. 14 match their counterparts v and $g_1$ in FIG. 13, and provided the initial states of prediction filters 71 and 71' are the same as each other, then the output u' will be a replica of the input u to the pre-emphasis filter 70.

Figure 15:
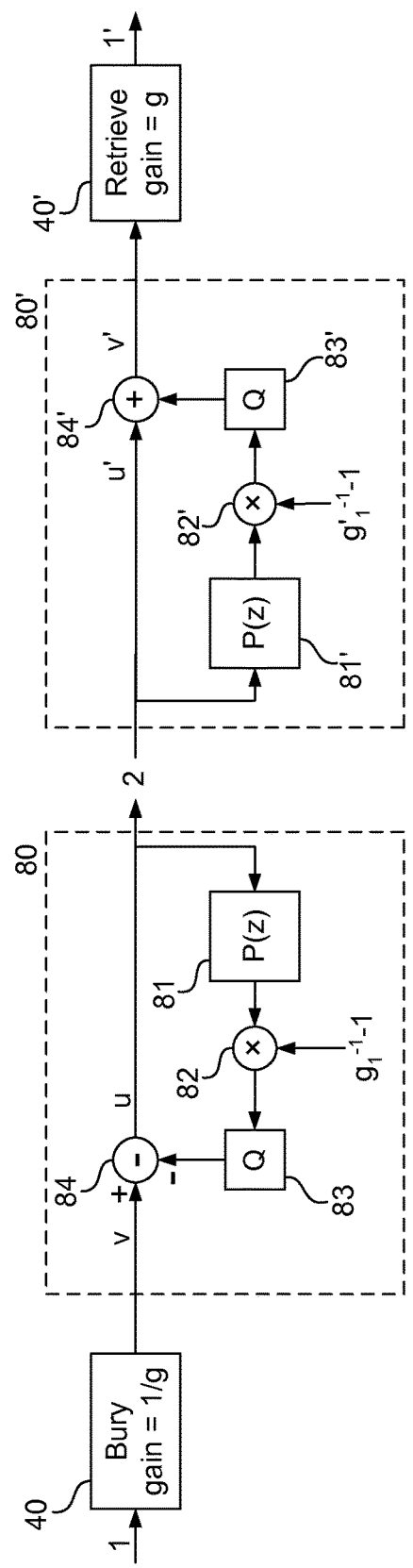
FIG. 15 shows an encoder and decoder in which pre-emphasis is applied after data have been buried; and, FIG. 16 shows an example data packet that may be transmitted in serialised form in lsbs of the prototype composite audio signal according to the method of FIG. 5.

The circuits of FIG. 13 and FIG. 14 may be rearranged in several ways, for example FIG. 15 shows the main signal path of an encoder and decoder in which the burying of data takes place before the pre-emphasis is applied. However pre-emphasis unit 80 in FIG. 15 is different from pre-emphasis unit 70 in FIG. 13 because of the desirability of feeding the prediction filter 81 from a signal that does not contain gain jumps if g (hence also $g_1$) changes discontinuously. The change in architecture changes the required input to the multiplier to $$\left(\frac{1}{g_1}-1\right)$$

from $(g_1-1)$ used in FIG. 13.

If P(z) is an FIR response, then the de-emphasis network 80' in FIG. 15 is also FIR, which ensures that state will be synchronised between the networks 80 and 80', regardless of the initial states, within m sample periods, where m is the order of the filters 81 and 81'. This may be a useful property in case a decoder is required to start decoding partway through a composite signal stream. However in this case pre-emphasis filter 80 has an all-pole response, which may be less suitable, if m is small, than all-zero response provided by the filter 70 in FIG. 13. Moreover for a fixed P(z) the variation of total response with $g_1$ may have awkward properties. Further the retrieval unit 40' in FIG. 15 is unable to retrieve values of g' until the value $g'_1$ used in the de-emphasis network 80' is already correct. This could be addressed by the LSB data channel methods, or it may be preferred therefore to use the architecture of FIG. 13 and FIG. 14. For faster convergence between the states of filters 81 and 81', it may be helpful to implement quantisers 83 and 83' as round-to-nearest operations rather than 'floor' or 'ceiling' operations, and in this case convergence should be extremely fast for values of $g_1$ close to unity.

A sufficient condition for stability of the de-emphasis filter 70' in FIG. 14 is $(1-g'1)\Sigma_{i=1}^{m}|p_i|<1$, where $P(z)=\Sigma_{i=1}^{m}p_i\cdot z^{-i}$. Thus, using the predictor $P(z)=2\cdot z^{-1}-z^{-2}$, the de-emphasis will be stable provided $$g'_1 > \frac{2}{3}.$$

The response shown in FIG. 12 is about 0.75 dB down at 7 kHz relative to DC. This can lead to a slight subjective dulling of the sound of the composite signal, despite the rising response at higher frequencies. It may be desirable to choose P(z) to minimise the perceptual effect of the encoder's total response $g^{-1}\cdot(1+(g_1-1)\cdot P(z))$, perhaps striking a compromise between this aspect and the effectiveness of P(z) as a prediction filter that minimises the perceptual effect of clicks caused by discontinuous changes in g. A system designer has the choice of whether to make prediction filter 71 a 'hardwired' filter, or a configurable filter, or a dynamically variable filter whose coefficients are communicated from the encoder to the decoder using the buried data channel.

Using pre-emphasis as described to provide a total low-frequency gain less than unity (e.g. h<1), low frequency original signals will not provoke clipping of the composite signal: only higher-frequency components of an original signal will do this. In practice it is found that only isolated signal samples clip, and the sample following a clipped sample usually has a value much lower than the clipping level. In these circumstances it may be possible to reduce the perceptual effect of the clip by modifying the following samples also. Thus, instead of simply reducing large sample by an amount c in order to conform to the clip limit of the format of the composite signal, the clipper 16 shown in FIG. 9 may add a sequence $-c\times(1, a_1, a_2, \ldots a_p)$ to the prototype composite signal 5. The clip restoration unit 60' in FIG. 10 will add the inverse sequence $+c\times(1, a_1, a_2, \ldots a_p)$ to the composite signal. The predetermined coefficients $a_i$ are chosen for minimal audibility of the disturbance. Choosing the $a_i$ is akin to designing a noise shaper, though the perceptual criterion is different since we are here considering large disturbances that are potentially masked by large high frequency content in the original signal.

Pulse Code Modulation (PCM) Perceptual Encryption

The invention in some embodiments provides a degraded digital audio signal that is audibly similar to an original digital audio signal but that carries its own restoration data, some or all of which are encrypted, such that original signal can be restored completely only if a decryption key is provided.

By burying the restoration data losslessly, the degraded signal can be presented in the same format (wordwidth and sampling rate) as the original signal.

Preferably, synchronisation information is conveyed periodically in the degraded signal so that a decoder may begin decoding partway through an encoded stream. The synchronisation information typically takes the form of a predetermined pattern of bits that can be recognised by a decoder, placed into least significant bit positions of the degraded stream, the signal bits that would otherwise occupy those positions being conveyed instead as buried data, in a manner such as has already been described in relation to the LSB Data Channel.

It may also be convenient similarly to convey the restoration data in least significant bit positions. This is the data that requires encryption; encryption can thus be conveniently performed by exclusively-ORing some of all of the least significant bits of the degraded stream with a keystream generated by a suitable stream cipher.

Salsa20/12 is a stream cipher suitable for generating the keystream, which has the useful property of supporting random access and thereby allowing decoding to start partway through an encoded stream. The encoder invokes Salsa20/12 repeatedly to processes a key, a sequence number and a nonce and thereby generate 512 bits of keystream. It is envisaged that the nonce ("number used once") be constant through the stream but the encoder increments the sequence number to produce each successive 512-bit segment of keystream.

Some degradation methods modify the audio signal in dependence on a pseudorandom sequence. As an alternative to encrypting high-level instructions that govern gross parameters of the degradation, the encryption key may be used as an input to the sequence generator, so that the fine structure of the modification is also dependent on the key. A stream cipher such as Salsa20/12 is a suitable sequence generator and may be invoked to generate a new pseudorandom number in dependence on the encryption key either on every audio sample or, for computational efficiency, at some lower rate.

Similar sequence generators will be used in the encoder and decoder, and will be provided with the same encryption key.

Sometimes causality considerations make it difficult or impossible to embed information into a stream that will allow a decoder restore the degradation that has been applied to the very beginning of a signal, so a short initial segment lasting usually less than a second may not be decoded losslessly. The term "lossless" will however be applied to encoding and decoding methods that are truly lossless save possibly for a short initial segment.

Figure 16:
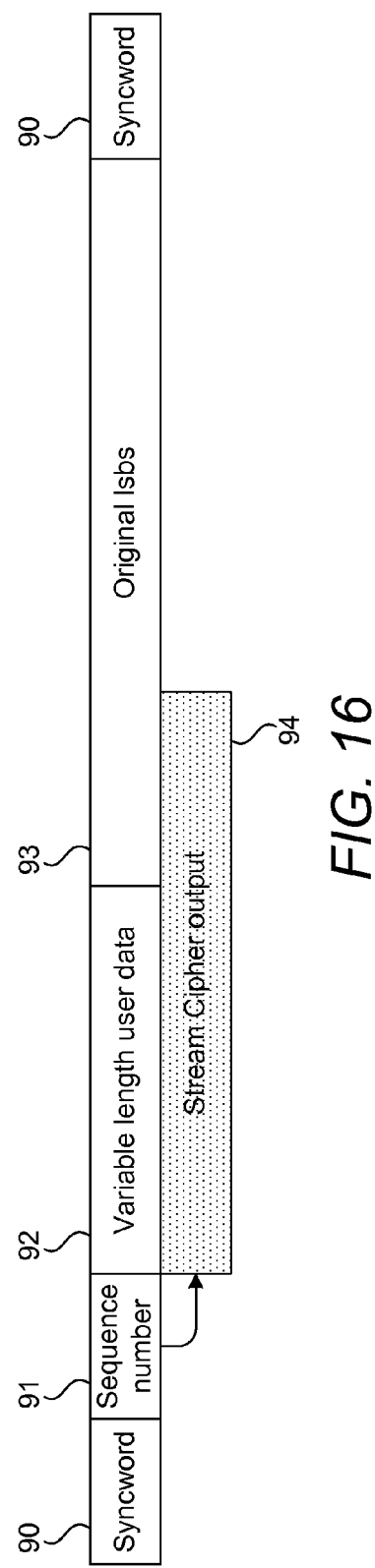

An example embodiment will now be described in which the main buried data channel 10 in FIG. 5 is be used to convey the least significant bit of the first 256 out of every 5000 samples of the original signal, the 256 least significant bits positions thus vacated being replaced by a data packet that of the form shown in FIG. 16. The packet starts with a fixed synchronisation word 90, recognisable by a decoder, followed by a sequence number 91. Assuming that a decoder is already in possession of the key and the nonce used by the encoder, the encoder and decoder each feed the sequence number, the key and a nonce already known to the decoder to identical keystream generators, which each generate a keystream segment 94.

The next 512 bits of the data packet are XORed with the keystream segment by the encoder and similarly recovered in the decoder by an XOR operation. It is envisaged that a portion 92 of these 512 bits will include configuration data such as gain values g, clip restoration data and any other parameters used by the invention, as well as any externally supplied data. The decoder then recovers those bits from the data channel to recreate an exact copy 1' of the original signal 1 in the manner previously described.

A length indication can be included in a fixed part of the configuration data to allow variable length user data to be encoded unambiguously. If the portion 92 is shorter than 512 bits, the XOR operation can be continued into the next segment 93, which can be arranged to contain lsbs of the original signal. Thus, even if an attacker were able to deduce the configuration data by some other means, it would still not be possible for him or her to regenerate the original signal losslessly without knowing the encryption key or being able to break the encryption itself.

In a multichannel stream, the sync word and sequence number could be distributed across all channels. So could the keystream be distributed across all channels, but it would be insecure to duplicate it across all channels. Different channels could use different nonces.

The invention claimed is:

1. A method of losslessly burying binary data into a pulse code modulated "PCM" digital audio signal, the method comprising:
receiving a PCM digital audio signal comprising samples having values that are quantised and define a range of values;
receiving binary data;
establishing a decoder gain g for a decoder, where 0.5<g, <1.0;
taking a quantised value of a sample and choosing a replacement sample value from a set of quantised values that, when mapped by the decoder gain g and quantised, yields a value equal to said quantised value of the sample; and
replacing the sample with a replacement sample having a value equal to the replacement sample value,
wherein, conditionally on the set of quantised values containing more than one value, the step of choosing the replacement sample is performed in dependence on the binary data, and
wherein the method provides a modified PCM signal from which a bit-exact replica of the PCM digital audio signal may be reconstructed.

2. A method according to claim 1, further comprising:
determining the set of quantised values that, when mapped by the decoder gain g and quantised, yields a value equal to said quantised value of the sample.

3. A method according to claim 1, further comprising the step of:
losslessly pre-emphasising the digital audio signal in order to reduce an amplitude of low frequency components.

4. A method of decoding a digital audio signal and extracting buried data, the method comprising:
receiving quantised signal samples comprising values that are quantised and that define a range of values;
processing a received quantised signal sample value using a predetermined algorithm, wherein the predetermined algorithm comprises applying a decoder gain g where 0.5<g<1, requantising to furnish an output signal sample; and
conditionally on whether the predetermined algorithm maps a plurality of possible quantised signal sample values to the output signal sample value, furnishing output data in dependence on which quantised signal sample value from the plurality was actually received,
wherein, when supplied with the modified PCM signal generated by a corresponding method according to claim 1, both the ensemble of output signal samples and the recovered output data replicate the PCM digital audio signal and the binary data received in the method of claim 1.

5. A method of losslessly burying binary data into a set of signal samples representing a portion of a digital audio signal, the method comprising:
dividing the set of signal samples into a first nonempty subset of signal samples and a second nonempty subset of signal samples;
losslessly burying the binary data into at least some signal samples in the first nonempty subset; and
decreasing a gain of signal samples in the first nonempty subset and increasing a gain of signal samples in the second nonempty subset so as to equalise the respective gains across both subsets by applying a lossless matrix transformation to the samples in each subset,
wherein the method provides a modified PCM signal from which a bit-exact replica of the digital audio signal may be reconstructed.

6. A method according to claim 5, wherein the step of losslessly burying the binary data comprises:
shifting a signal sample left by n places where n is a positive integer, the signal sample thereby acquiring a gain of $2^n$; and,
inserting a bit of binary data into one of the n least significant bit positions of the sample.

7. A method according to claim 5, further comprising the step of:
losslessly pre-emphasising the digital audio signal in order to reduce an amplitude of low frequency components.

8. A method of retrieving binary data from a set of signal samples representing a portion of a digital audio signal, the method comprising:
dividing the set of signal samples into a first nonempty subset of signal samples and a second nonempty subset of signal samples; and,
retrieving the binary data from signal samples in the first nonempty subset; and
applying a lossless matrix transformation to the samples in the set,
wherein the step of retrieving is performed using a lossless buried data method,
wherein the lossless matrix transformation increases the gain of signal samples in the first nonempty subset and decreases the gain of signal samples in the second nonempty subset so as to equalise the respective gains across both subsets, and wherein the lossless matrix transformation enables the portion of the digital audio signal to be reconstructed such that the reconstructed audio data is bit-exact.

9. A method according to claim 8, further comprising the step of:

losslessly de-emphasising the digital audio signal in order to reconstruct an amplitude of frequency components that have been altered by lossless pre-emphasis.

10. A method of losslessly placing binary data into a predetermined set of bit positions within a stream of audio data bits representing a PCM digital audio signal, the method comprising:

retrieving signal bits from the predetermined set of bit positions;

losslessly burying the retrieved signal bits into the stream of audio data bits representing the PCM digital audio signal; and placing the binary data into bit positions within the predetermined set of bit positions, wherein the losslessly burying of the retrieved signal bits enables the PCM digital audio signal to be reconstructed such that the reconstructed audio data is bit-exact.

11. A method according to claim 10, wherein the predetermined bit positions are the 16th bit of each of a predetermined set of samples of the PCM digital audio signal.

12. A method according to claim 10, wherein the step of losslessly burying does not change the contents of the bit positions in the predetermined set of bit positions.

13. A method according to claim 10, further comprising the step of:

losslessly pre-emphasising the digital audio signal in order to reduce an amplitude of low frequency components.

14. The method according to claim 10, wherein the binary data comprises synchronisation patterns recognizable by a decoder.

15. A method of losslessly retrieving binary data from a modified stream of audio data bits representing an original PCM digital audio signal, the method comprising:

establishing a set of bit positions within the modified stream that contain binary data;

retrieving binary data bits from the set of bit positions;

retrieving signal bits from the PCM digital audio signal modified stream using a method of lossless buried data; and placing the signal bits into the set of bit positions, wherein the method provides a bit-exact replica of the original PCM digital audio signal.

16. A method according to claim 15, wherein the set of bit positions consists of the 16th bit position of each of a set of samples of the PCM digital audio signal.

17. A method according to claim 15, further comprising the step of:

losslessly de-emphasising the digital audio signal in order to reconstruct an amplitude of frequency components that have been altered by lossless pre-emphasis.

18. The method according to claim 15, wherein the step of establishing comprises searching for a synchronisation pattern.

19. A method of losslessly burying binary data into a stream of audio data bits representing a PCM digital audio signal, the method comprising:

losslessly pre-emphasising the PCM digital audio signal thus reducing an amplitude of lower frequency components and boosting an amplitude of higher frequency components; and losslessly burying the binary data into the PCM digital audio signal, wherein the step of losslessly burying the binary data into the PCM digital audio signal comprises applying a gain greater than 1.0 and less than 2.0, the low frequency gain of the pre-emphasis cancels the gain of the burying step, and the losslessly burying of the binary data enables the PCM digital audio signal to be reconstructed such that the reconstructed audio data is bit-exact.

20. A method according to claim 19, wherein the step of losslessly burying comprises losslessly burying the binary data into the losslessly pre-emphasised PCM digital audio signal.

21. A method according to claim 19, wherein the step of losslessly burying comprises altering a gain of the PCM digital audio signal.

22. A method of losslessly retrieving a PCM digital audio signal from a set of signal samples representing the PCM digital audio signal into which binary data has been losslessly buried by the method of claim 19, the method comprising:

retrieving the binary data from the set of signal samples using a method of lossless buried data comprising applying a gain greater than 0.5 and less than 1.0; and losslessly de-emphasising the set of signal samples in order to reconstruct an amplitude of frequency components of the PCM digital audio signal that have been altered by lossless pre-emphasis.

23. An encoder for losslessly burying binary data stored in memory into a stream of audio data bits representing a PCM digital audio signal, wherein the encoder is adapted to:

losslessly pre-emphasise, by a processing device of the encoder, the PCM digital audio signal thus reducing an amplitude of lower frequency components and boosting an amplitude of higher frequency components; and losslessly bury, by the processing device, the binary data stored in memory into the PCM digital audio signal, wherein the step of losslessly burying the binary data stored in memory into the PCM digital audio signal comprises applying a gain greater than 1.0 and less than 2.0, the low frequency gain of the pre-emphasis cancels the gain of the burying step, and the losslessly burying of the binary data stored in memory enables the PCM digital audio signal to be reconstructed such that the reconstructed audio data is bit-exact.

24. A decoder for losslessly retrieving a PCM digital audio signal from a set of signal samples stored in memory representing the PCM digital audio signal into which binary data has been losslessly buried, wherein the decoder is adapted to:

losslessly retrieve, by a processing device of the decoder, the binary data from the set of signal samples stored in memory using a method of lossless buried data comprising applying a gain greater than 0.5 and less than 1.0; and losslessly de-emphasise, by the processing device, the set of signal samples stored in memory in order to reconstruct an amplitude of frequency components of the PCM digital audio signal that have been altered by lossless preemphasis, wherein the losslessly retrieving of the binary data enables the PCM digital audio signal to be reconstructed such that the reconstructed audio data is bit-exact.

25. A codec comprising:

an encoder for losslessly burying binary data into a stream of audio data bits representing a PCM digital audio signal; and a decoder for losslessly retrieving the PCM digital audio signal from a set of signal samples representing the PCM digital audio signal into which binary data has been losslessly buried by the encoder, wherein the encoder is adapted to losslessly pre-emphasise the PCM digital audio signal thus reducing an amplitude of lower frequency components and boosting an amplitude of higher frequency components, and losslessly bury the binary data into the PCM digital audio signal, wherein the step of losslessly burying the binary data into the PCM digital audio signal comprises applying a gain greater than 1.0 and less than 2.0, and the low frequency gain of the pre-emphasis cancels the gain of the burying step, wherein the decoder is adapted to retrieve the binary data from the set of signal samples using a method of lossless buried data comprising applying a gain greater than 0.5 and less than 1.0, and losslessly de-emphasise the set of signal samples in order to reconstruct an amplitude of frequency components of the PCM digital audio signal that have been altered by lossless pre-emphasis, and wherein the losslessly burying of the binary data enables the PCM digital audio signal to be reconstructed such that the reconstructed audio data is bit-exact.

* * * * *

UNITED STATES PATENT AND TRADEMARK OFFICE
CERTIFICATE OF CORRECTION

PATENT NO.        : 9,870,777 B2
APPLICATION NO.   : 14/353660
DATED             : January 16, 2018
INVENTOR(S)       : Peter Graham Craven and Malcolm Law It is certified that error appears in the above-identified patent and that said Letters Patent is hereby corrected as shown below:

On the Title Page

Item (71) Applicant:
First named applicant should read as: "Peter Graham Craven, Surrey (GB)"

Item (72) Inventors:
First named inventor should read as: "Peter Graham Craven, Surrey (GB)"

Signed and Sealed this
Twenty-fourth Day of April, 2018

Andrei Iancu
*Director of the United States Patent and Trademark Office*

UNITED STATES PATENT AND TRADEMARK OFFICE
CERTIFICATE OF CORRECTION

PATENT NO. : 9,870,777 B2
APPLICATION NO. : 14/353660
DATED : January 16, 2018
INVENTOR(S) : Peter Graham Craven and Malcolm Law Page 1 of 1

It is certified that error appears in the above-identified patent and that said Letters Patent is hereby corrected as shown below:

On the Title Page

(71) Applicant:
First named applicant should read as: "Peter Graham Craven, Surrey (UK)"
Second named applicant should read as "Malcolm Law, West Sussex (UK)"

(72) Inventors:
First named inventor should read as: "Peter Graham Craven, Surrey (UK)"
Second named inventor should read as "Malcolm Law, West Sussex (UK)"

Signed and Sealed this
Sixth Day of August, 2019

Andrei Iancu
*Director of the United States Patent and Trademark Office*